United States Patent
Frank

(10) Patent No.: US 8,280,040 B2
(45) Date of Patent: Oct. 2, 2012

(54) PROCESSOR INSTRUCTIONS FOR IMPROVED AES ENCRYPTION AND DECRYPTION

(75) Inventor: Michael Frank, Sunnyvale, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 902 days.

(21) Appl. No.: 12/365,543

(22) Filed: Feb. 4, 2009

(65) Prior Publication Data

US 2010/0195820 A1    Aug. 5, 2010

(51) Int. Cl.
*G06F 21/00* (2006.01)

(52) U.S. Cl. ........................................... 380/28

(58) Field of Classification Search ............. 380/28
See application file for complete search history.

(56) References Cited

U.S. PATENT DOCUMENTS

| | | | |
|---|---|---|---|
| 7,623,660 | B1 * | 11/2009 | Cory ............................ 380/200 |
| 8,175,265 | B2 * | 5/2012 | Ciet et al. ....................... 380/29 |
| 2003/0105791 | A1 | 6/2003 | Stein et al. |
| 2004/0153642 | A1 | 8/2004 | Plotkin et al. |
| 2004/0202317 | A1 | 10/2004 | Demjanenko et al. |
| 2005/0132186 | A1 | 6/2005 | Khan et al. |
| 2005/0132226 | A1 | 6/2005 | Wheeler et al. |
| 2005/0271204 | A1 | 12/2005 | Chu |
| 2006/0002548 | A1 | 1/2006 | Chu |
| 2006/0050887 | A1 | 3/2006 | Chen |
| 2006/0085636 | A1 | 4/2006 | Osaki |
| 2006/0090084 | A1 | 4/2006 | Buer |
| 2006/0136735 | A1 | 6/2006 | Plotkin et al. |
| 2007/0237326 | A1 * | 10/2007 | Nonaka et al. .................. 380/37 |
| 2008/0046756 | A1 | 2/2008 | Dempski et al. |
| 2008/0159526 | A1 | 7/2008 | Gueron et al. |
| 2008/0170700 | A1 * | 7/2008 | Darba ........................... 380/278 |
| 2008/0240423 | A1 * | 10/2008 | Gueron et al. ................. 380/28 |
| 2009/0092252 | A1 | 4/2009 | Noll et al. |
| 2009/0097639 | A1 | 4/2009 | Hotta et al. |

FOREIGN PATENT DOCUMENTS

| EP | 2048810 | 4/2009 |
|---|---|---|
| WO | 2008/059420 | 5/2008 |

OTHER PUBLICATIONS

International Search Report and Written Opinion for International Application No. PCT/US2010/023169, mailed Oct. 21, 2010; 12 pages.
"AES Instruction Set"; Wikipedia article; Accessed Jun. 23, 2009; http://en.wikipedia.org/wiki/AES_instruction_set; 2 pages.
"Bulldozer (microarchitecture)"; Wikipedia article; Accessed Jun. 23, 2009; http://en.wikipedia.org/wiki/Bulldozer_(processor); 2 pages.
"AES: Add Support to Intel AES-NI Instructions"; Dec. 12, 2008; http://lwn.net/Articles/311094/; 7 pages.

(Continued)

*Primary Examiner* — Michael Pyzocha
(74) *Attorney, Agent, or Firm* — Meyertons Hood Kivlin Kowert & Goetzel, P.C.; Jeffrey C. Hood

(57) ABSTRACT

Encrypting information involving the execution of a first instruction and a second instruction on a processor. The first instruction causes the processor to perform an AddRoundKey transformation followed by a ShiftRows transformation. The second instruction causes the processor to perform a ShiftRows transformation followed by a MixColumns transformation. These instructions are useful for performing AES encryption. The first and second instructions also have inverse modes that may be used to perform AES decryption.

20 Claims, 18 Drawing Sheets

--- execute a first instruction on a first array of data, where the execution of the first instruction includes (a) performing an AddRoundKey transformation on the first array of data to determine a second array of data and (b) performing a SubBytes transformation on the second array of data to determine a third array of data
2710

↓ execute a second instruction on the third array of data, where the execution of the second instruction includes (c) performing a ShiftRows transformation on the third array of data to determine a fourth array of data and (d) performing a MixColumns transformation on the fourth array of data to determine a fifth array of data   2720

↓ store the fifth array of data in a memory medium after a last of the plurality of rounds   2730

OTHER PUBLICATIONS

"https://everywhere! Encrypting the Internet"; Oct. 6, 2008; http://blogs.intel.com/research/2008/10/httpseverywhere_encrypting_the.php; 2 pages.

"Advanced Encryption Standard"; Wikipedia article; Accessed Jun. 23, 2009; http://en.wikipedia.org/wiki/Advanced_Encryption_Standard; 12 pages.

"Announcing the Advanced Encryption Standard (AES)"; Federal Information Processing Standards Publication 197; Nov. 26, 2001; http://www.csrc.nist.gov/publications/fips/fips197/fips-197.pdf; 51 pages.

* cited by examiner $$\begin{bmatrix} y7 \\ y6 \\ y5 \\ y4 \\ y3 \\ y2 \\ y1 \\ y0 \end{bmatrix} = \begin{bmatrix} 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \\ 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \end{bmatrix} \begin{bmatrix} x7 \\ x6 \\ x5 \\ x4 \\ x3 \\ x2 \\ x1 \\ x0 \end{bmatrix} \oplus \begin{bmatrix} 0 \\ 1 \\ 1 \\ 0 \\ 0 \\ 0 \\ 1 \\ 1 \end{bmatrix}$$

*FIG. 7*

$$\begin{bmatrix} y7 \\ y6 \\ y5 \\ y4 \\ y3 \\ y2 \\ y1 \\ y0 \end{bmatrix} = \begin{bmatrix} 0 & 1 & 0 & 1 & 0 & 0 & 1 & 0 \\ 0 & 0 & 1 & 0 & 1 & 0 & 0 & 1 \\ 1 & 0 & 0 & 1 & 0 & 1 & 0 & 0 \\ 0 & 1 & 0 & 0 & 1 & 0 & 1 & 0 \\ 0 & 0 & 1 & 0 & 0 & 1 & 0 & 1 \\ 1 & 0 & 0 & 1 & 0 & 0 & 1 & 0 \\ 0 & 1 & 0 & 0 & 1 & 0 & 0 & 1 \\ 1 & 0 & 1 & 0 & 0 & 1 & 0 & 0 \end{bmatrix} \begin{bmatrix} x7 \\ x6 \\ x5 \\ x4 \\ x3 \\ x2 \\ x1 \\ x0 \end{bmatrix} \oplus \begin{bmatrix} 0 \\ 0 \\ 0 \\ 0 \\ 0 \\ 1 \\ 0 \\ 1 \end{bmatrix}$$

*FIG. 8*

| | | | | | | | LSN | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | A | B | C | D | E | F |
| MSN | 0 | 00 | 01 | 8D | F6 | CB | 52 | 7B | D1 | E8 | 4F | 29 | C0 | B0 | E1 | E5 | C7 |
| | 1 | 74 | B4 | AA | 4B | 99 | 2B | 60 | 5F | 58 | 3F | FD | CC | FF | 40 | EE | B2 |
| | 2 | 3A | 6E | 5A | F1 | 55 | 4D | A8 | C9 | C1 | 0A | 98 | 15 | 30 | 44 | A2 | C2 |
| | 3 | 2C | 45 | 92 | 6C | F3 | 39 | 66 | 42 | F2 | 35 | 20 | 6F | 77 | BB | 59 | 19 |
| | 4 | 1D | FE | 37 | 67 | 2D | 31 | F5 | 69 | A7 | 64 | AB | 13 | 54 | 25 | E9 | 09 |
| | 5 | ED | 5C | 05 | CA | 4C | 24 | 87 | BF | 18 | 3E | 22 | F0 | 51 | EC | 61 | 17 |
| | 6 | 16 | 5E | AF | D3 | 49 | A6 | 36 | 43 | F4 | 47 | 91 | DF | 33 | 93 | 21 | 3B |
| | 7 | 79 | B7 | 97 | 85 | 10 | B5 | BA | 3C | B6 | 70 | D0 | 06 | A1 | FA | 81 | 82 |
| | 8 | 83 | 7E | 7F | 80 | 96 | 73 | BE | 56 | 9B | 9E | 95 | D9 | F7 | 02 | B9 | A4 |
| | 9 | DE | 6A | 32 | 6D | D8 | 8A | 84 | 72 | 2A | 14 | 9F | 88 | F9 | DC | 89 | 9A |
| | A | FB | 7C | 2E | C3 | 8F | B8 | 65 | 48 | 26 | C8 | 12 | 4A | CE | E7 | D2 | 62 |
| | B | 0C | E0 | 1F | EF | 11 | 75 | 78 | 71 | A5 | 8E | 76 | 3D | BD | BC | 86 | 57 |
| | C | 0B | 28 | 2F | A3 | DA | D4 | E4 | 0F | A9 | 27 | 53 | 04 | 1B | FC | AC | E6 |
| | D | 7A | 07 | AE | 63 | C5 | D8 | E2 | EA | 94 | 8B | C4 | D5 | 9D | F8 | 90 | 6B |
| | E | B1 | 0D | D6 | EB | C6 | 0E | CF | AD | 08 | 4E | D7 | E3 | 5D | 50 | 1E | B3 |
| | F | 5B | 23 | 38 | 34 | 68 | 46 | 03 | 8C | DD | 9C | 7D | A0 | CD | 1A | 41 | 1C |

*FIG. 9*

Psuedo Code for PSBOX

```
unsigned byte PSBOX(unsigned byte x; unsigned byte key; byte imm8)
{
        unsigned byte temp1, temp2, temp3;

temp3 = (imm8 & 0x04) ? 0x00 : 0xff ;
        temp3 = temp3 ^ key;

if (imm8 & 0x01)
                // table lookup for the inverse affine transform
                temp1 = inverse_affine[x];
        else
                temp1 = (x ^ temp3 );

// table lookup for multiplicative inverse
        temp2 = multiplicative_inverse[temp1];

if (imm8 & 0x02)
                // table lookup for the affine transform
                return (temp2 ^ temp3 );
        else
                return ( affine[temp2] );
}
```

FIG. 13

$$\begin{bmatrix} S'_{0,c} \\ S'_{1,c} \\ S'_{2,c} \\ S'_{3,c} \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} S_{0,c} \\ S_{1,c} \\ S_{2,c} \\ S_{3,c} \end{bmatrix}$$

FIG. 18

$S'_{0,c} = \{02\} \bullet S_{0,c} \oplus \{03\} \bullet S_{1,c} \oplus \{01\} \bullet S_{2,c} \oplus \{01\} \bullet S_{3,c}$
$S'_{1,c} = \{01\} \bullet S_{0,c} \oplus \{02\} \bullet S_{1,c} \oplus \{03\} \bullet S_{2,c} \oplus \{01\} \bullet S_{3,c}$
$S'_{2,c} = \{01\} \bullet S_{0,c} \oplus \{01\} \bullet S_{1,c} \oplus \{02\} \bullet S_{2,c} \oplus \{03\} \bullet S_{3,c}$
$S'_{3,c} = \{03\} \bullet S_{0,c} \oplus \{01\} \bullet S_{1,c} \oplus \{01\} \bullet S_{2,c} \oplus \{02\} \bullet S_{3,c}$

FIG. 19

| Product Terms | Modulus Correction |
|---|---|
| s[0] = (b[0] & a[0]) | ^ (b[7] & a[1]) |
| s[1] = (b[1] & a[0]) ^ (b[0] & a[1]) | ^ (b[7] & a[1]) |
| s[2] = (b[2] & a[0]) ^ (b[1] & a[1]) | |
| s[3] = (b[3] & a[0]) ^ (b[2] & a[1]) | ^ (b[7] & a[1]) |
| s[4] = (b[4] & a[0]) ^ (b[3] & a[1]) | ^ (b[7] & a[1]) |
| s[5] = (b[5] & a[0]) ^ (b[4] & a[1]) | |
| s[6] = (b[6] & a[0]) ^ (b[5] & a[1]) | |
| s[7] = (b[7] & a[0]) ^ (b[6] & a[1]) | |

$$\begin{bmatrix} S_{0,c} \\ S_{1,c} \\ S_{2,c} \\ S_{3,c} \end{bmatrix} = \begin{bmatrix} 0e & 0b & 0d & 09 \\ 09 & 0e & 0b & 0d \\ 0d & 09 & 0e & 0b \\ 0b & 0d & 09 & 0e \end{bmatrix} \begin{bmatrix} S'_{0,c} \\ S'_{1,c} \\ S'_{2,c} \\ S'_{3,c} \end{bmatrix}$$

*FIG. 22*

$S'_{0,c} = \{0e\} \bullet S_{0,c} \oplus \{0b\} \bullet S_{1,c} \oplus \{0d\} \bullet S_{2,c} \oplus \{09\} \bullet S_{3,c}$
$S'_{1,c} = \{09\} \bullet S_{0,c} \oplus \{0e\} \bullet S_{1,c} \oplus \{0b\} \bullet S_{2,c} \oplus \{0d\} \bullet S_{3,c}$
$S'_{2,c} = \{0d\} \bullet S_{0,c} \oplus \{09\} \bullet S_{1,c} \oplus \{0e\} \bullet S_{2,c} \oplus \{0b\} \bullet S_{3,c}$
$S'_{3,c} = \{0b\} \bullet S_{0,c} \oplus \{0d\} \bullet S_{1,c} \oplus \{09\} \bullet S_{2,c} \oplus \{0e\} \bullet S_{3,c}$

*FIG. 23*

```
            Product Terms              Modulus Correction
------------------------------------------------------------
q[0] = (b[0] & a[0]) ^ (b[7] & a[1])
q[1] = (b[1] & a[0]) ^ (b[0] & a[1])   ^ (b[7] & a[1])
q[2] = (b[2] & a[0]) ^ (b[1] & a[1])
q[3] = (b[3] & a[0]) ^ (b[2] & a[1])   ^ (b[7] & a[1])
q[4] = (b[4] & a[0]) ^ (b[3] & a[1])   ^ (b[7] & a[1])
q[5] = (b[5] & a[0]) ^ (b[4] & a[1])
q[6] = (b[6] & a[0]) ^ (b[5] & a[1])
q[7] = (b[7] & a[0]) ^ (b[6] & a[1])
-----------------------product terms 4 & 8-----------------------
p[0] = (b[0] & a[2]) ^ (b[7] & a[3])
p[1] = (b[1] & a[2]) ^ (b[0] & a[3])   ^ (b[7] & a[3])
p[2] = (b[2] & a[2]) ^ (b[1] & a[3])
p[3] = (b[3] & a[2]) ^ (b[2] & a[3])   ^ (b[7] & a[3])
p[4] = (b[4] & a[2]) ^ (b[3] & a[3])   ^ (b[7] & a[3])
p[5] = (b[5] & a[2]) ^ (b[4] & a[3])
p[6] = (b[6] & a[2]) ^ (b[5] & a[3])
p[7] = (b[7] & a[2]) ^ (b[6] & a[3])
-------------------------product terms------------------------
s[0] = q[0]          ^ p[6]
s[1] = q[1]          ^ p[6] ^ p[7]
s[2] = q[2] ^ p[0]   ^ p[6] ^ p[7]
s[3] = q[3] ^ p[1]   ^ p[6]
s[4] = q[4] ^ p[2]          ^ p[7]
s[5] = q[5] ^ p[3]          ^ p[7]
s[6] = q[6] ^ p[4]
s[7] = q[7] ^ p[5]
```

-- upper two bits p = ( (a>>2) & 0x01 )? (b): (0x00);

p = p ^ ( (a>>3) & 0x01 ) ? ((b & 0x7f) << 1) : (0x00);

p = p ^ ( (a>>3) & (b>>7) & 0x01 ) ? (0x1b) : (0x00);

--muliply by 4 and correct for bits 7 and 6 s = p ^ ( (q & 0x3f) << 2);

| Operation | AND | XOR | |
|---|---|---|---|
| Single Multiply | 32 | 36 | |
| For all 16 elements x 4 | 2048 | 2304 | Gates |
| Addition of intermediate results | | 384 | Gates |
| Total (not optimized) | 2048 | 2688 | Gates |

*FIG. 26* execute a first instruction on a first array of data, where the execution of the first instruction includes (a) performing an AddRoundKey transformation on the first array of data to determine a second array of data and (b) performing a SubBytes transformation on the second array of data to determine a third array of data
2710 execute a second instruction on the third array of data, where the execution of the second instruction includes (c) performing a ShiftRows transformation on the third array of data to determine a fourth array of data and (d) performing a MixColumns transformation on the fourth array of data to determine a fifth array of data   2720 store the fifth array of data in a memory medium after a last of the plurality of rounds   2730

FIG. 33 execute a first instruction on a first array of data, where said execution of the first instruction includes (a) performing an inverse SubBytes transformation on the first array of data to determine a second array of data and (b) performing an AddRoundKey transformation on the second array of data to determine a third array of data   2810 execute a second instruction on the third array of data, where said execution of the second instruction includes (c) performing an inverse MixColumns transformation on the third array of data to determine a fourth array of data and (d) performing an inverse ShiftRows transformation on the fourth array of data to determine a fifth array of data   2820 store the fifth array of data in a memory medium after a last of said rounds.
2830

FIG. 34

PROCESSOR INSTRUCTIONS FOR IMPROVED AES ENCRYPTION AND DECRYPTION

FIELD OF THE INVENTION

The present invention relates to the field of data encryption, and more particularly, to improved mechanisms for implementing data encryption/decryption.

DESCRIPTION OF THE RELATED ART

Encryption and decryption are commonly used for protecting proprietary data or to control access to digital content (e.g., as in digital rights management—DRM). One widely used encryption algorithm is AES (Advanced Encryption Standard), also known as Rijndael. The AES algorithm has been adopted as an encryption standard and has been described in U.S. FIPS PUB 197 which is hereby incorporated by reference in its entirety as though fully and completely set forth herein. The AES algorithm is split into a number of "rounds". The number $n_R$ of rounds may be 10, 12 or 14 depending on a "key length". Each round except for the last is a so-called "full" round including four operations. The last round is a "partial" round including only three of the four operations. Encryption and decryption use different sequences of the same operations and also use different sets of constants (such as affine transformation, permutation pattern and multiplication matrix) in the operations.

Encryption/decryption operations are now commonly implemented in the software stack of many computer systems. However, encryption/decryption implemented in software has performance limitations. For example, current off-the-shelf x86 CPUs do not natively support the arithmetic operations required for Galois Field arithmetic, which is used in AES. Therefore, the user pays a performance penalty when data is encrypted or decrypted. This penalty severely limits the utility of encryption and sometimes forces users to forgo protection because too much processing power is being used.

Thus, improved systems and methods are desired for performing encryption and/or decryption operations.

SUMMARY OF THE INVENTION

Various embodiments of a system and method for performing encryption and/or decryption are disclosed herein.

In one set of embodiments, a method for performing data encryption involves a plurality of rounds. In each of the rounds, a processor may execute a first instruction followed by a second instruction. The processor's execution of the first instruction may include: (a) performing an AddRoundKey transformation on a first array of data to determine a second array of data and (b) performing a SubBytes transformation on the second array of data to determine a third array of data. The processor's execution of the second instruction may include: (c) performing a ShiftRows transformation on the third array of data to determine a fourth array of data and (d) performing a MixColumns transformation on the fourth array of data to determine a fifth array of data. The processor may store the fifth array of data in a memory medium after a last of the rounds. After the last round, the fifth array of data represents an encrypted version of the first data array used in the initial round.

In the process of performing the AddRoundKey transformation, the processor may operate on elements of the first array in a parallel fashion.

In the process of performing the SubBytes transformation, the processor may operate on elements of the second array in a parallel fashion.

In the process of performing the ShiftRows transformation, the processor may operate on rows of the third array in a parallel fashion.

In the process of performing the MixColumns transformation, the processor may operate on columns of the fourth array in a parallel fashion.

In one set of embodiments, a method for performing data decryption involves a plurality of rounds. In each of the rounds, a processor may execute a first instruction followed by a second instruction. The processor's execution of the first instruction may include (a) performing an inverse SubBytes transformation on the first array of data to determine a second array of data and (b) performing an AddRoundKey transformation on the second array of data to determine a third array of data. The processor's execution of the second instruction may include: (c) performing an inverse MixColumns transformation on the third array of data to determine a fourth array of data and (d) performing an inverse ShiftRows transformation on the fourth array of data to determine a fifth array of data. The processor may then store the fifth array of data in a memory medium after a last of the rounds. After the last round, the fifth array of data represents an encrypted version of the first data array used in the initial round.

In the process of performing the inverse SubBytes transformation, the processor may operate on elements of the first array in a parallel fashion.

In the process of performing the AddRoundKey transformation, the processor may operate on elements of the second array in a parallel fashion.

In the process of performing the inverse MixColumns transformation, the processor may operate on columns of the third array in a parallel fashion.

In the process of performing the inverse ShiftRows transformation, the processor may operate on rows of the fourth array in a parallel fashion.

In one set of embodiments, a processor for performing encryption and/or decryption may be configured to include a plurality of execution units, an encryption/decryption unit (EDU), and a fetch-decode-and-schedule (FDS) unit. The FDS unit may be coupled to the EDU and the plurality of execution units and configured to fetch a stream of instructions. The stream of instructions may include instructions of a baseline instruction set and an extension instruction. The FDS unit may be configured to: decode the baseline instructions (i.e., the instructions of the baseline instruction set) and the extension instruction; schedule execution of the decoded baseline instructions on the plurality of execution units; and schedule execution of the decoded extension instruction on the EDU. The EDU may be configured to perform: (a) an AddRoundKey transformation followed by a SubBytes transformation, or, (b) an inverse SubBytes transformation followed by an AddRoundKey transformation, in response to the FDS unit's scheduling of execution of the decoded extension instruction. In one embodiment, the EDU may be configured to perform (a) or (b) depending on the value of an immediate operand supplied as part of the extension instruction.

In one embodiment, the stream of instructions also includes a second extension instruction. The FDS unit may be configured to decode the second extension instruction and to schedule execution of the decoded second extension instruction on the EDU. The EDU may be configured to perform: (c) a ShiftRows transformation followed by a MixColumns transformation, or, (b) an inverse MixColumns transformation followed by an inverse ShiftRows transformation, in response to the FDS unit's scheduling of execution of the decoded second extension instruction.

In one embodiment, the EDU may be configured to perform the ShiftRows transformation by operating on each row of a two-dimensional state array in parallel.

In one embodiment, the EDU may be configured to perform the MixColumns transformation by operating on each column of a two-dimensional state array in parallel.

In one embodiment, the EDU may be configured to perform the AddRoundKey transformation by operating on each element of a two-dimensional state array in parallel.

BRIEF DESCRIPTION OF THE DRAWINGS

A better understanding of the present invention can be obtained when the following detailed description of the preferred embodiments is considered in conjunction with the following drawings.

FIG. 7 illustrates an affine transformation that is used in one embodiment of the PSBOX instruction (in the forward mode).

FIG. 8 illustrates an affine transformation that is used in one embodiment of the PSBOX instruction (in the inverse mode).

FIG. 9 illustrates a multiplicative inverse Table used to implement the SBOX portion of the PSBOX instruction according to one embodiment.

FIG. 13 illustrates pseudo code for the PSBOX instruction according to one embodiment.

FIG. 18 illustrates a matrix-vector multiplication used to implement a Galois Field multiplication according to one embodiment of the MixColumns portion of the PRCMIXB instruction.

FIG. 19 gives Galois Field expressions for implementing the MixColumns transformation in one embodiment of the PRCMIXB instruction.

FIG. 20 gives logic equations for implementing the MixColumns transformation in one embodiment of the PRCMIXB instruction.

FIG. 21 is pseudo code corresponding to the MixColumns transformation in one embodiment of the PRCMIXB instruction.

FIG. 22 illustrates a matrix-vector multiplication used to implement a Galois Field multiplication according to one embodiment of the inverse MixColumns transformation in one embodiment of the PRCMIXB instruction (inverse mode).

FIG. 23 gives Galois Field expressions for implementing the inverse MixColumns transformation in one embodiment of the PRCMIXB instruction (inverse mode).

FIG. 24 gives logic equations for implementing the inverse MixColumns transformation in one embodiment of the PRCMIXB instruction (inverse mode).

FIG. 25 is pseudo code corresponding to the inverse MixColumns transformation in one embodiment of the PRCMIXB instruction (inverse mode).

FIG. 26 is table illustrating the hardware requirements to multiply any of the 16 input elements by a 4-bit GF value and then add up four of the 64 intermediate results, according to one embodiment of the MixColumns transformation.

FIG. 33 illustrates one embodiment of a method for performing encryption.

FIG. 34 illustrates one embodiment of a method for performing decryption.

Figure 1:
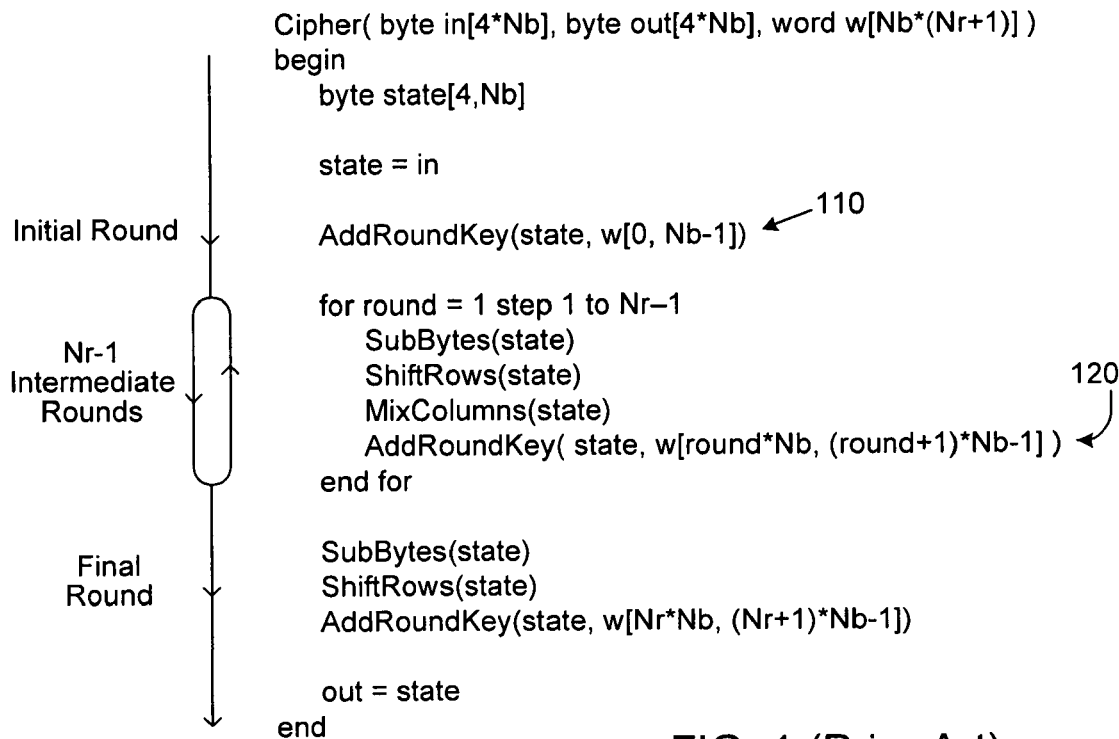
FIG. 1 is pseudo code for the AES (Advanced Encryption Standard) cipher.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The AES cipher and inverse cipher are familiar in the art of cryptography. Both are described in Federal Information Processing Standards Publication 197 (hereinafter "FIPS 197"), published on Nov. 26, 2001 by the National Institute of Standards and Technology (NIST). FIPS 197 is hereby incorporated by reference in its entirely. FIG. 1 presents pseudo code illustrating the AES cipher. (See FIPS 197 for the definition of the functions, variables and data structures used in this figure.) The cipher is organized in terms of a number of "rounds". There is an initial round that includes only the AddRoundKey transformation, Nr−1 intermediate rounds that each include four transformations, and a final round that includes three transformations, where Nr is a positive integer that depends on the key length being used, as described in FIPS 197. Each intermediate round includes a SubBytes transformation, a ShiftRows transformation, a MixColumns transformation and an AddRoundKey transformation. The final round is similar to an intermediate round except that the MixColumns transformation is omitted.

Figure 2:
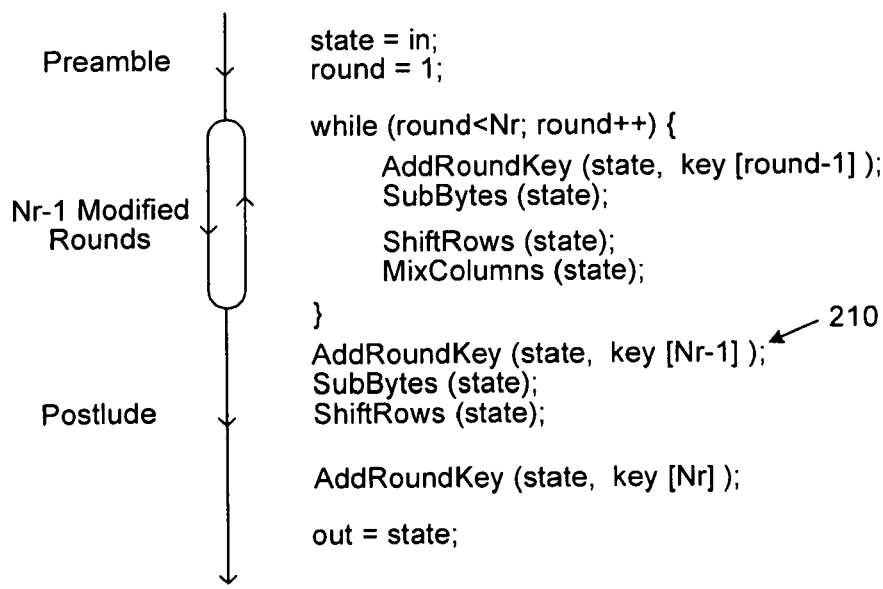
FIG. 2 is pseudo code for one embodiment of the AES cipher using a modified definition for the round.

In one set of embodiments, a new type of round is used, i.e., a round including the following sequence of four transformations: AddRoundKey, SubBytes, ShiftRows and MixColumns. The reader will observe that this sequence is a cyclic forward-shift-by-one of the four transformations defining the intermediate round of FIG. 1. FIG. 2 presents pseudo code for the AES cipher using the modified round. The modified round may be performed Nr−1 times. (See the while loop of FIG. 2.) Notice that the AddRoundKey transformation 110 of the initial round from FIG. 1 has been absorbed into the first iteration of the while loop of FIG. 2. In addition, the AddRoundKey 120 of the last intermediate round from FIG. 1 has moved to a position 210 after the while loop of FIG. 2.

Figure 3:
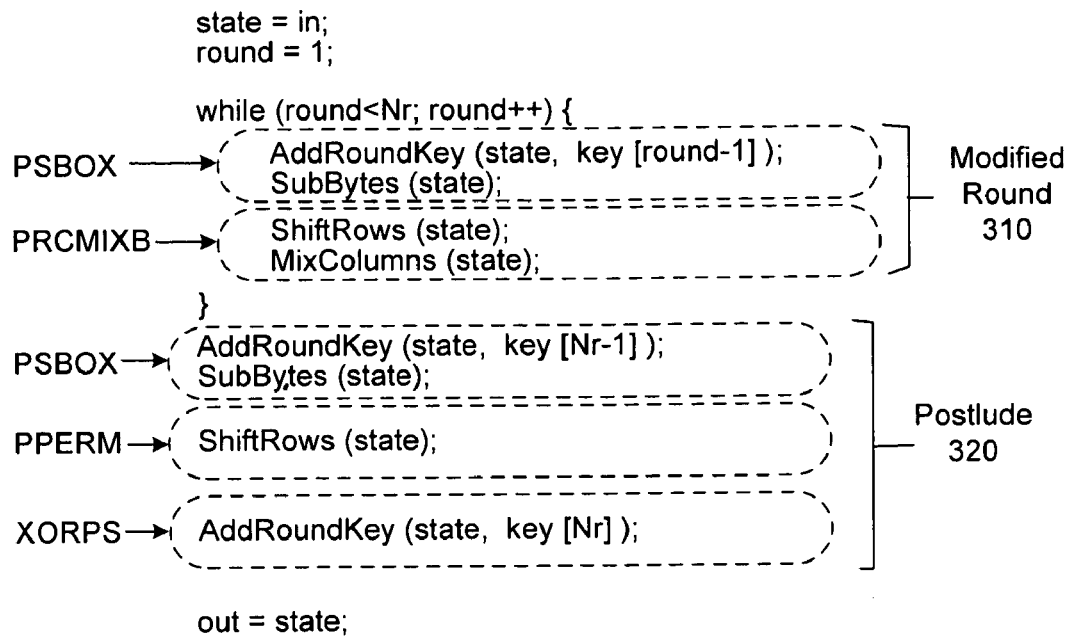
FIG. 3 illustrates the mapping of pairs of transformations in the cipher of FIG. 2 to new instructions.

In some embodiments, a processor (e.g., a microprocessor) may be configured to support (a) a first instruction, referred to herein as the PSBOX instruction, that causes the processor to perform the AddRoundKey transformation and the SubBytes transformation, and (b) a second instruction, referred to herein as the PRCMIXB instruction, that causes the processor to perform the ShiftRows transformation and the MixColumns transformation. As shown in FIG. 3, which repeats the pseudo code of FIG. 2 for convenience of discussion, the modified round 310 may be implemented by executing a PSBOX instruction followed by a PRCMIXB instruction. Notice that the combination of AddRoundKey followed by SubBytes also occurs in the postlude portion 320 of FIG. 3. Thus, the PSBOX instruction may be used here too.

The postlude portion 320 also includes a ShiftRows transformation and a final occurrence of the AddRoundKey transformation. In one embodiment, the ShiftRows transformation may be implemented using a PPERM instruction of SSE5, and the final AddRoundKey transformation may be implemented using an XORPS instruction of SSE. (SIMD is an acronym for "Single-Instruction Multiple-Data". SSE is an acronym for "Streaming SIMD Extensions" promulgated by Intel Corporation) (SSE5 is an acronym for "Streaming SIMD Extensions version 5" announced by Advanced Micro Devices, Inc.)

Figure 4:
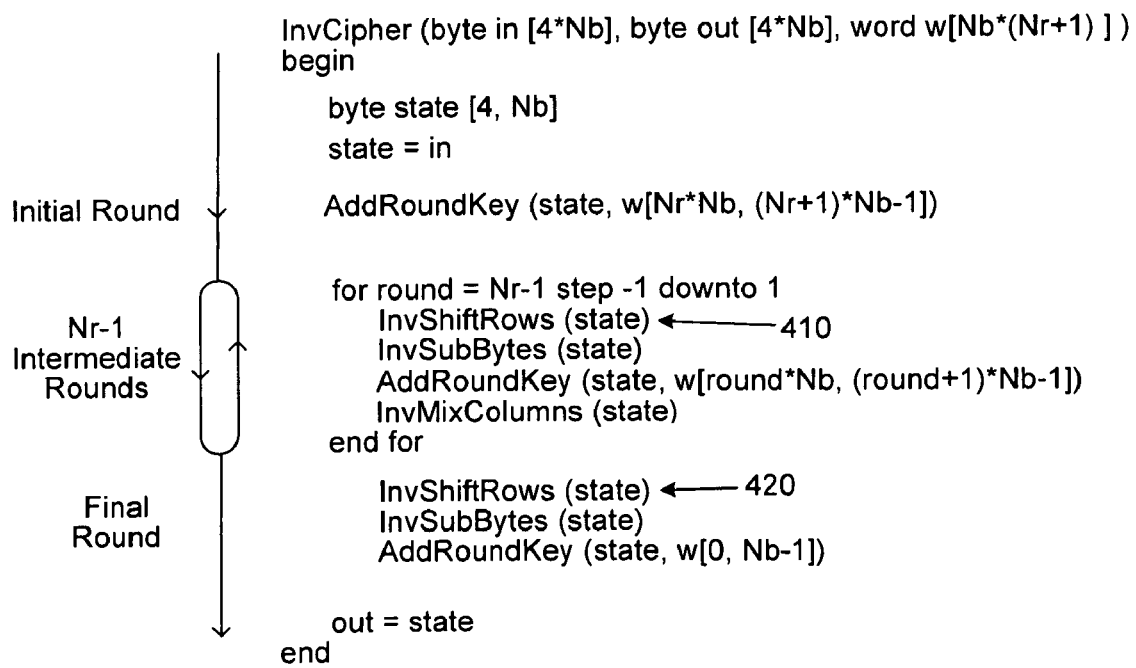
FIG. 4 is pseudo code for the AES inverse cipher.

Similar to the cipher, the AES inverse cipher is organized in terms of an initial round, Nr−1 intermediate rounds and a final round. See FIG. 4. The initial round includes the AddRoundKey transformation. Each of the Nr−1 intermediate rounds includes an InvShiftRows transformation, an InvSubBytes transformation, an AddRoundKey transformation and an InvMixColumns transformation. The final round includes an InvShiftRows transformation, an InvSubBytes transformation and an AddRoundKey transformation. The InvShiftRows transformation inverts the action of the ShiftRows transformation. The InvSubBytes transformation inverts the action of the SubBytes transformation. The InvMixColumns transformation inverts the action of the MixColumns transformation. The AddRoundKey transformation is its own inverse. (See FIPS 197 for the definition of the functions, variables and data structures used in FIG. 4.)

Figure 5:
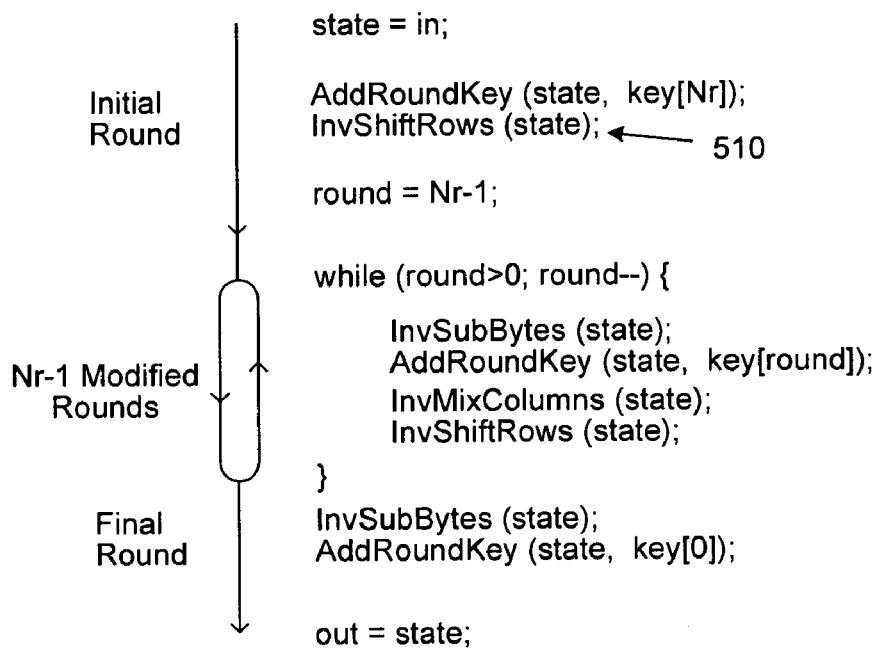
FIG. 5 is pseudo code for one embodiment of the AES inverse cipher using a modified definition for the round.

In some embodiments, a new type of round may be used to perform the inverse cipher, i.e., a round including the following sequence of four transformations: InvSubBytes, AddRoundKey, InvMixColumns and InvShiftRows. FIG. 5 presents pseudo code for the AES inverse cipher using the modified round. The modified round may be performed Nr−1 times. (See the while loop of FIG. 5.) Notice that the InvShiftRows transformation 410 of the initial iteration of the for loop in FIG. 4 has moved to a position 510 prior to the while loop of FIG. 5. In addition, the InvSubBytes transformation 420 occurring in the final round of FIG. 4 has been absorbed into the while loop of FIG. 5.

As described above, the processor may be configured to support the PSBOX instruction and the PRCMIXB instruction. In some embodiments, the PSBOX instruction includes mode selection bits that are used to select a forward mode or an inverse mode. In the forward mode, the PSBOX instruction causes the process to perform the AddRoundKey transformation followed by the SubBytes transformation as described above. In the inverse mode, the PSBOX instruction causes the processor to perform the InvSubBytes transformation followed by the AddRoundKey transformation. Similarly, the PRCMIXB instruction may include mode selection bits that are used to select a forward mode or an inverse mode. In the forward mode, the PRCMIXB instruction causes the processor to perform the ShiftRows transformation followed by the MixColumns transformation as described above. In the inverse mode, the PRCMIXB instruction causes the processor to perform the InvMixColumns transformation followed by the InvShiftRows transformation.

Figure 6:
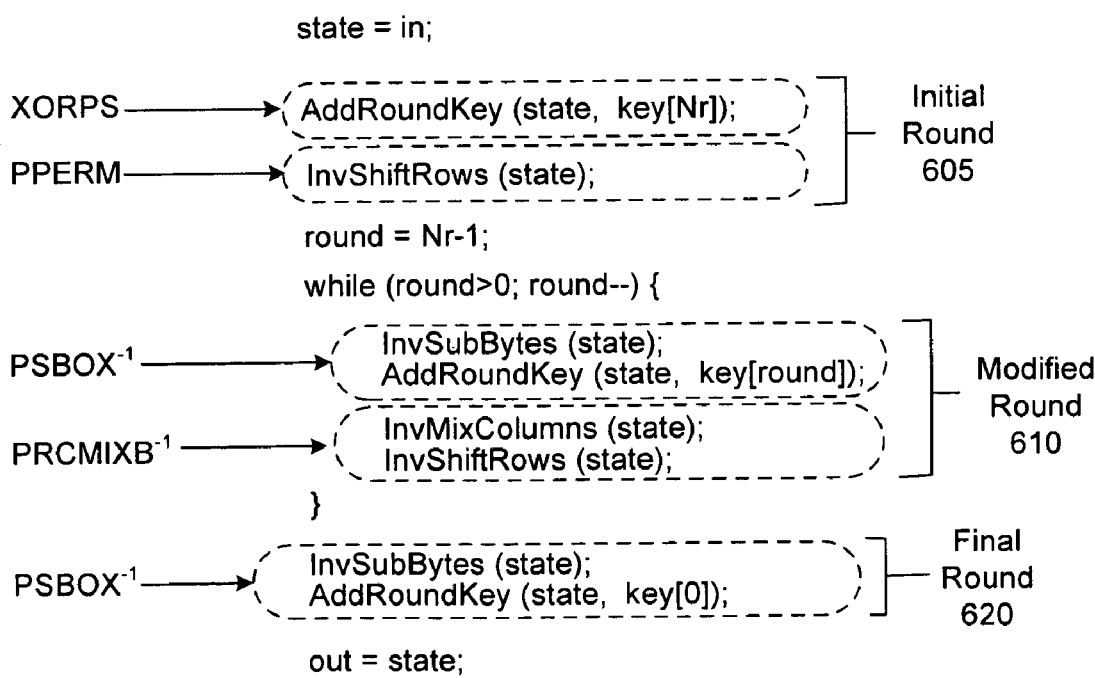
FIG. 6 illustrates the mapping of pairs of transformation in the inverse cipher of FIG. 5 to the new instructions.

As shown in FIG. 6, which repeats the pseudo code of FIG. 5 for convenience of discussion, the modified round 610 may be implemented by executing a PSBOX instruction followed by a PRCMIXB instruction, with both instructions set to inverse mode. Notice that the combination of InvSubBytes followed by AddRoundKey also occurs in the final round 620 of FIG. 6. Thus, the PSBOX instruction may be used here too (with inverse mode selected). In addition, the initial round 605 includes an AddRoundKey transformation and an InvShiftRows transformation. In one embodiment, the AddRoundKey transformation may be implemented using an XORPS instruction of SSE, and the InvShiftRows transformation may be implemented using a PPERM instruction of SSE5.

In some embodiments, use of the PSBOX instruction and the PRCMIXB instruction as described herein may allow a cipher program or decipher program to be achieved with fewer instructions, thus saving memory for code storage.

In one embodiment, a processor may be configured to execute the PSBOX instruction in a parallel fashion. See the description below in connection with FIGS. 11 and 12.

In one embodiment, a processor may be configured to execute the PRCMIXB instruction in a parallel fashion. See the description below in connection with FIGS. 21 and 22.

In one embodiment, a processor may be configured to execute the PSBOX instruction and the PRCMIXB instruction in a pipelined fashion. For example, given two blocks of input data to be enciphered, the process may execute the PRCMIXB instruction on state information corresponding to the first input block, and simultaneously execute the PSBOX instruction on state information corresponding to the second input block.

Packed AES SBOX (PSBOX) Instruction

As described above, the PSBOX instruction includes a forward mode and an inverse mode. In the forward mode, the PSBOX instruction performs an AddRoundKey transformation followed by a SubBytes transformation. In the inverse mode, the PSBOX instruction performs an InvSubBytes transformation followed by an AddRoundKey transformation. Other modes may be supported as well.

The PSBOX instruction may include a mnemonic, a specification of a source register and a specification of an immediate value. The immediate value may be used to determine the mode selection.

In one embodiment, the source register is a 16-byte register and the immediate value is a 16-byte value. (In other embodiments, the source register and immediate value may have other sizes.)

In the forward mode, the PSBOX instruction adds each byte of the RoundKey to a corresponding byte of the source register to form an intermediate result, and then performs a forward SBOX operation on each byte of the intermediate result to obtain a final result. The forward SBOX operation involves a multiplicative inverse function followed by a affine transformation T1.

In the inverse mode, the PSBOX instruction performs an inverse SBOX operation on each byte of the source register to form an intermediate result, and then adds each byte of the RoundKey to a corresponding byte of the intermediate result to obtain the final result. The inverse SBOX operation involves an affine transformation T2 followed a multiplicative inverse function.

Thus, in either mode the PSBOX instruction may be implemented using three underlying operations: an addition operation, a multiplicative inverse function and an affine transformation. However, these operations are applied in different orders depending on the selected mode. In forward mode, the addition operation is first, the multiplicative inverse function is second, and the affine transformation is third. In inverse mode, the affine transformation is first, the multiplicative inverse function is second, and the addition operation is third.

Given a byte x and a byte r of the RoundKey, the addition operation corresponds to the addition in $GF(2^8)$. The addition operation may be implemented as a bitwise XOR, i.e., each bit of the byte x may be XORed with the corresponding bit of the round key byte r.

Given a nonzero byte x, the multiplicative inverse function returns a byte y such that $x*y=1$, where x and y are interpreted as elements in $GF(2^8)$ and "*" denotes the multiplication of $GF(2^8)$. $GF(2^8)$ is the Galois Field of order $2^8$. Thus, y is the multiplicative inverse of x in the Galois Field. In a more suggestive notation, y is written "1/x". If x is zero, the multiplicative inverse function may return zero (0x00). In one embodiment, the inverse function may be implemented in software, using a table lookup with the argument x being an index into a 256-entry table that contains the inverse values. In another embodiment, the inverse function may be implemented in hardware, e.g., in terms of discrete gates.

Given a byte x, the affine transform may be interpreted mathematically as a polynomial multiplication modulo the prime polynomial 0x11B (binary 100011011), followed by the addition of a constant. The polynomial coefficients are interpreted as values in $GF(2)$. In one embodiment, the affine transformation may be implemented as a matrix multiplication followed by a vector addition: $y=mx+v$, where m is an 8×8 matrix, and y and v are each a vector with 8 elements. The components of y, m, x and v are interpreted as elements in $GF(2)$. The affine transform applied in the forward mode and that applied in the inverse mode are distinguished based on the choices of m and v as shown in FIGS. 7 and 8. FIG. 7 corresponds to the affine transformation of the forward mode and FIG. 8 to the affine transformation of the inverse mode.

In a hardware implementation it is more efficient to perform the three operations (AddRoundKey, multiplicative inverse and affine transform) in logic. The logic implementation may be optimized by deriving the multiplicative inverse in a different basis representation. A software implementation may disregard the basis transformation.

The same multiplicative inverse function is used in the forward and inverse SBOX transformations. The multiplicative inverse function may be implemented using the Table of FIG. 9. The input byte X is used to address the table. "LSN" denotes the least significant nibble of X. "MSN" denotes the most significant nibble of X.

Figure 10:
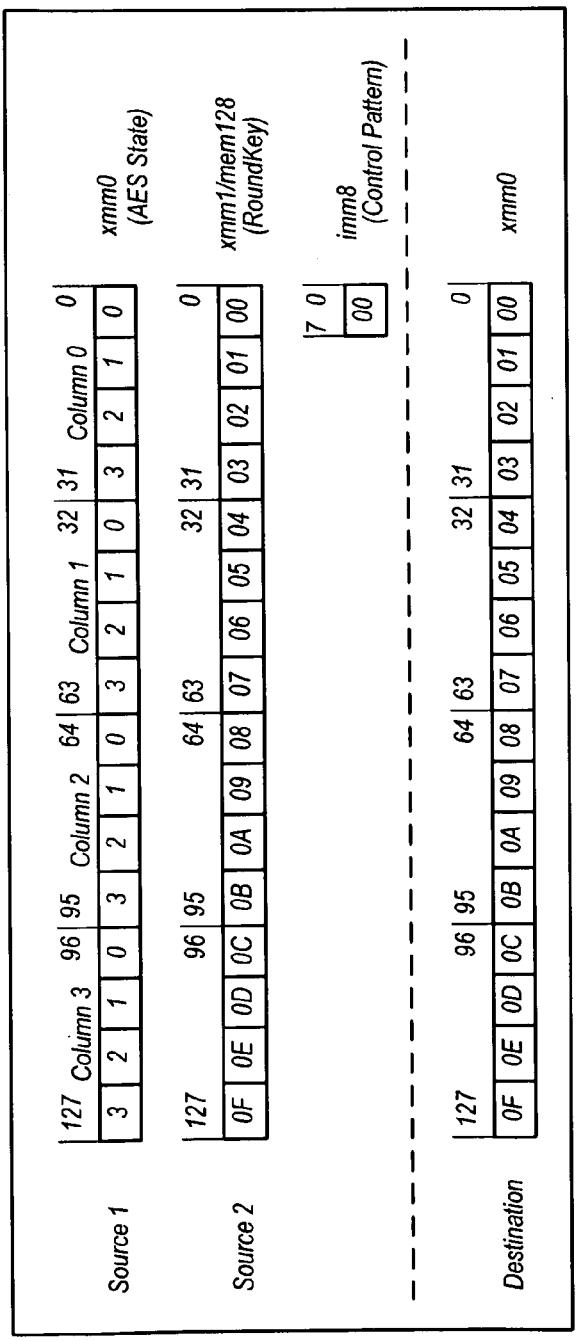
FIG. 10 illustrates the operands used in one embodiment of the PSBOX instruction.

In one embodiment, the PSBOX instruction conforms to the following assembly language syntax: "PSBOX xmm0, xmm1/mem128, imm8", where xmm0 and xmm1 denote 128-bit registers, mem128 denotes a reference to a 128-bit block of memory, and imm8 denotes an 8-bit immediate value (control pattern), as shown in FIG. 10. The notation "xmm1/mem128" indicates that either xmm1 or mem128 may be selected by the programmer. The register xmm0 holds the current State, and the second source (xmm1/mem128) holds the RoundKey. The register xmm0 is also used as the destination for the PSBOX instruction.

Figure 11:
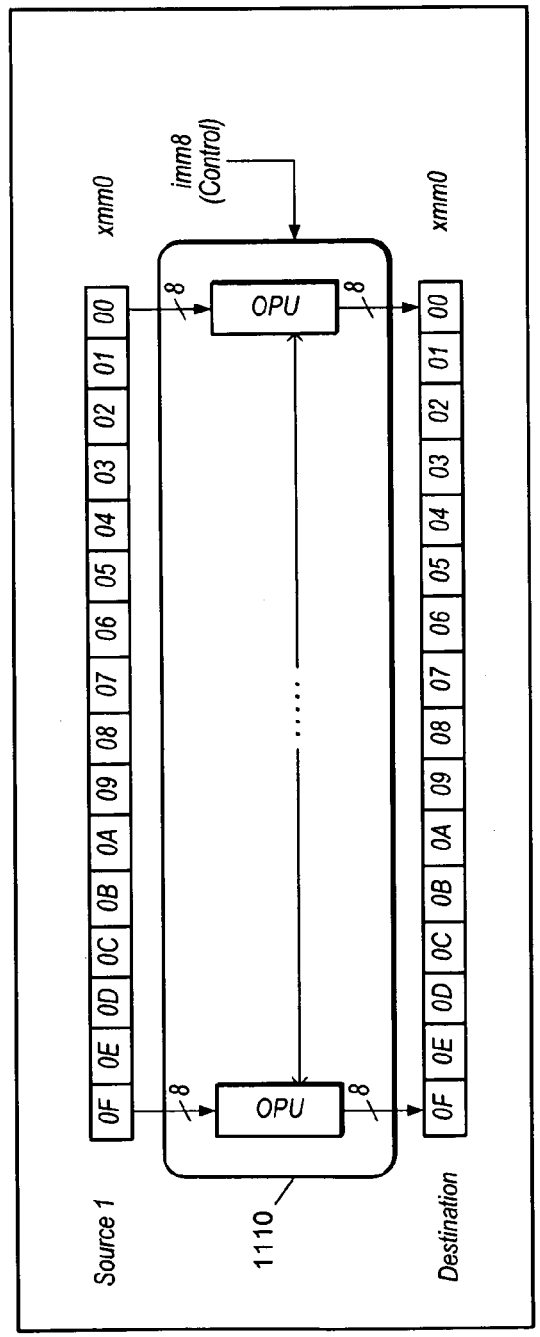
FIG. 11 illustrates one embodiment of a module 1110 used to implement one embodiment of the PSBOX instruction in a parallel fashion.

In one embodiment, all 16 bytes of the State (xmm0) may be operated on in parallel, e.g., as illustrated by in FIG. 11. Thus, the processor may module 1110 having 16 operational units (OPUs) arranged in parallel. Each OPU operates on a corresponding one of the bytes in the register xmm0 and a corresponding one of the bytes in the second source operand (xmm1/mem128). To avoid excessive complexity in the diagram, the inputs corresponding to the second source operand are not shown.

Figure 12:
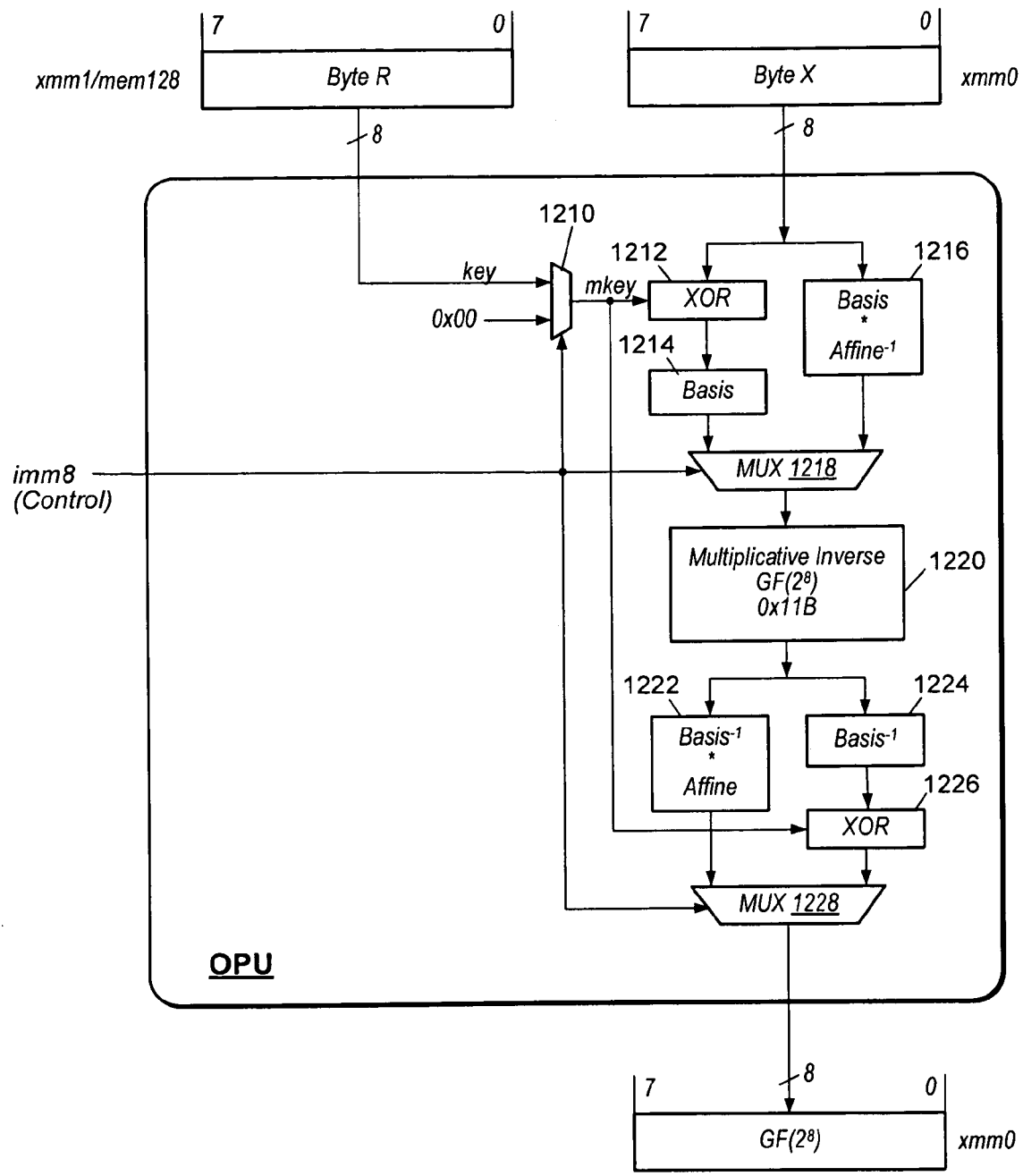
FIG. 12 illustrates one embodiment of an operational unit OPU used to implement a byte-sized portion of the PSBOX instruction according to one embodiment.

FIG. 12 illustrates one embodiment of the operational unit OPU. The OPU receives a byte X of the register xmm0 and a corresponding byte R of the second source operand (xmm1/mem128). The byte X is supplied to the XOR unit 1212 and the unit 1216. The byte R is supplied to a first input of the multiplexer 1210. The multiplexer 1210 selects either the byte R or the zero byte based on a bit of the immediate value imm8. The selected value is denoted "mkey". In one embodiment, multiplexer 1210 is controlled by the third bit, (i.e., the bit of weight 4) of the immediate value.

The XOR unit 1212 computes the XOR of each bit of byte X with the corresponding bit of mkey. Unit 1214 performs a basis transformation on the output byte from the XOR unit 1212. The resultant byte generated by the basis unit 1218 is supplied to multiplexer 1218.

Unit 1216 applies the basis transformation to the byte X to obtain an intermediate byte, and then applies the inverse affine transformation (e.g., as described above) to the intermediate byte to obtain an output byte. The output byte is supplied to multiplexer 1218.

Multiplexer 1218 selects either the resultant byte from basis unit 1214 or the output byte from unit 1216 based on a bit of the immediate value imm8. In one embodiment, the first bit (i.e., the bit of weight 1) in the immediate value is used to control multiplexer 1218. The output byte from multiplexer 1218 is supplied to the inverse unit 1220.

Inverse unit 1220 determines the multiplicative inverse of the output byte supplied by mux 1218. The resultant byte from the inverse unit is supplied to unit 1222 and unit 1224.

Unit 1222 performs an inverse basis transformation on the resultant byte from the inverse unit to obtain an intermediate byte, and performs the forward affine transformation (e.g., as described above) on the intermediate byte to determine an output byte. The output byte is supplied to multiplexer 1228.

Unit 1224 performs an inverse basis transformation on the resultant byte from the inverse unit to obtain an intermediate byte. XOR unit 1226 computes the XOR of each bit of the intermediate byte with the corresponding bit of mkey to obtain an output byte.

Multiplexer 1228 selected between the output byte from unit 1222 and the output byte from XOR unit 1226 based on a bit of the immediate value imm8. In one embodiment, the second bit (i.e., the bit of weight 2) of the immediate value is used to control the multiplexer 1228. The selected byte is provided as output to the register xxm0 (i.e., the same byte position occupied by input byte X).

By appropriate setting of bits in the immediate value, the operational unit OPU may be configured to perform any of the following: (a) an AddRoundKey transformation followed by a SubBytes transformation, (b) an inverse SubBytes transformation followed by an AddRoundKey transformation, (c) a SubBytes transformation, (d) an inverse SubBytes transformation.

As noted above, the PSBOX instruction may be used in the encryption process or FIG. 3 and the decryption process of FIG. 6. Furthermore, the PSBOX instruction may be used in the key expansion algorithm.

FIG. 13 illustrates an implementation of the PSBOX instruction in terms of a pseudo code function of the same name. In one embodiment, a processor may be configured to execute the function in microcode.

Packed AES Row and Column Mixer (PRCMIXB) Instruction

As described above, the PRCMIXB instruction includes a forward mode and an inverse mode. In the forward mode, the PRCMIXB instruction causes the processor to perform the ShiftRows transformation followed by the MixColumns transformation as described above. In the inverse mode, the PRCMIXB instruction causes the processor to perform the InvMixColumns transformation followed by the InvShiftRows transformation. The PRCMIXB instruction may use an immediate operand to select the mode.

The MixColumns transformation involves matrix multiplying two packed vectors, each having 16 bytes, using Galois Field arithmetic with a prime polynomial of 0x11B. The 16 bytes in source operand xmm1 are interpreted as a 4×4 matrix of 8-bit values, each value representing a $7^{th}$ order polynomial over a 256-element Galois Field GF($2^8$). Similarly, the 16 bytes of the second source operand, xmm2/mem128, are similarly interpreted. The polynomials have binary coefficients. A prime polynomial of $8^{th}$ order, corresponding to 0x11B, is used for modulo division, as required by FIPS 197. The MixColumns transformation is performed conditionally, also controlled by the immediate operand.

In one embodiment, the PRCMIXB instruction uses a two-operand format. The first operand, xmm0, is the destination operand. The second operand, xmm1/mem128, is the source operand. Each 32-bit word in the source operand (xmm1/mem128) is interpreted as a column of the state vector P. Similarly, each 32-bit word in the destination operand (xmm0) is interpreted as a column of the modified state vector.

In one embodiment, the PRCMIXB instruction may have the following assembly-language syntax: "PRCMIXB xmm0, xmm1/mem128, imm8". The third operand is the immediate operand that controls mode selection.

Figure 14:
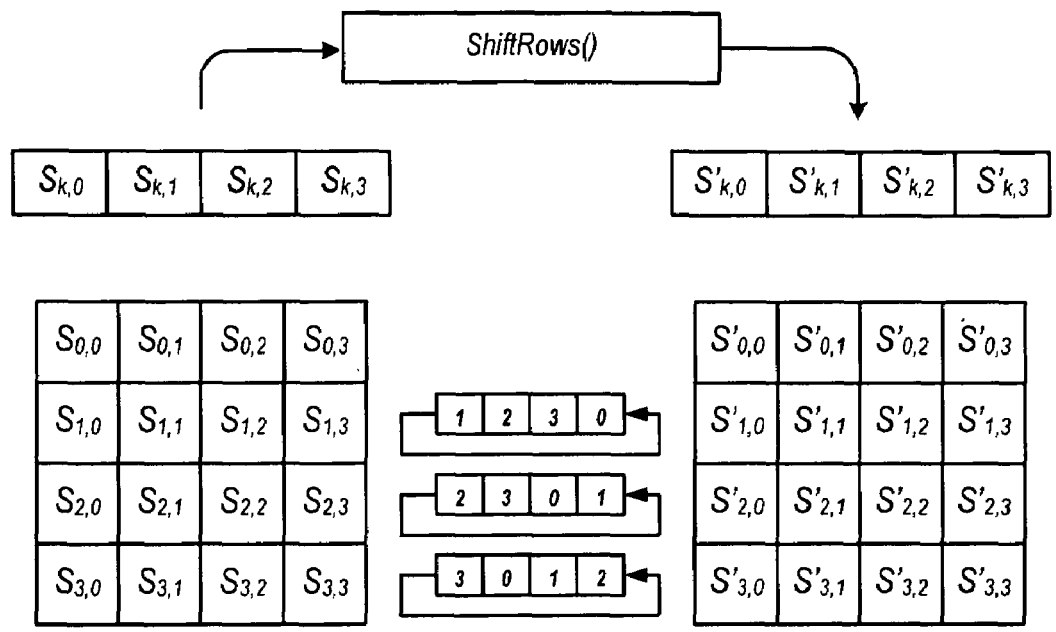
FIG. 14 illustrates one embodiment of the ShiftRows portion of the PRCMIXB instruction.

The ShiftRows transformation cyclically shifts the bytes in the $k^{th}$ row of the State matrix by k positions to the left, as suggested by FIG. 14. The elements of the state matrix are denoted as $S_{i,j}$ before transformation and as $S'_{i,j}$ after transformation. The inverse ShiftRows transformation cyclically shifts the bytes in the $k^{th}$ row of the State matrix by k positions to the right (or equivalently, 4-k positions to the left for k nonzero).

Figure 15:
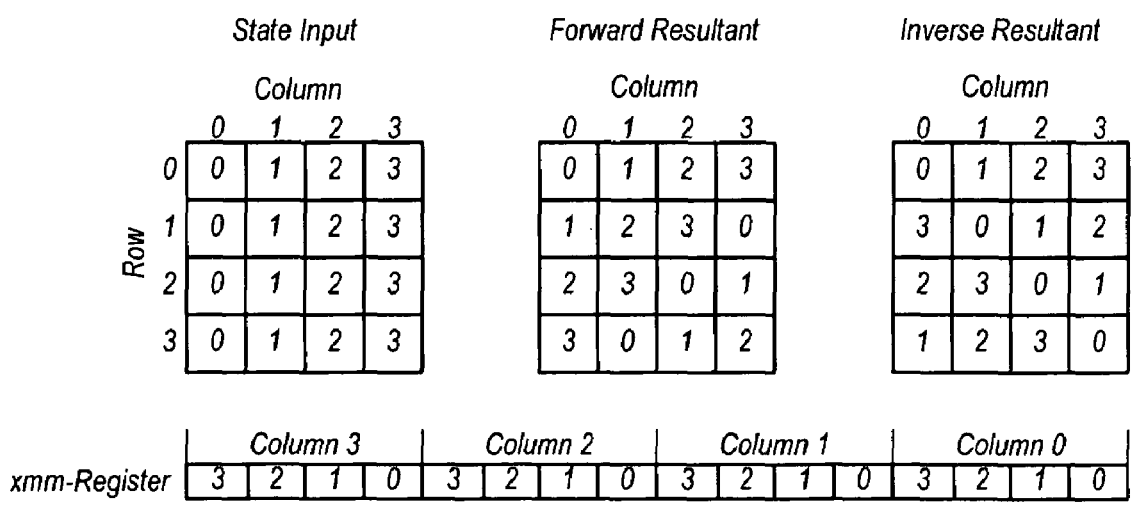
FIG. 15 illustrates one embodiment of the action of the forward and inverse ShiftRows transformation on the elements of the state array, and one embodiment of the mapping of state array columns to the bytes of an xmm register.

In one embodiment, the mapping between the component positions of the state matrix and the byte positions in the 128-bit xmm register is shown in FIG. 15. The mapping may be summarized by the following expression:

$$xmm[(col<<2)+row]=state[col][row],$$

where "<<" denotes the left shift operator. The data may be stored in memory in column major order. FIG. 15 also illustrates the resultant state matrix after the forward and inverse ShiftRows transformation.

Figure 16:
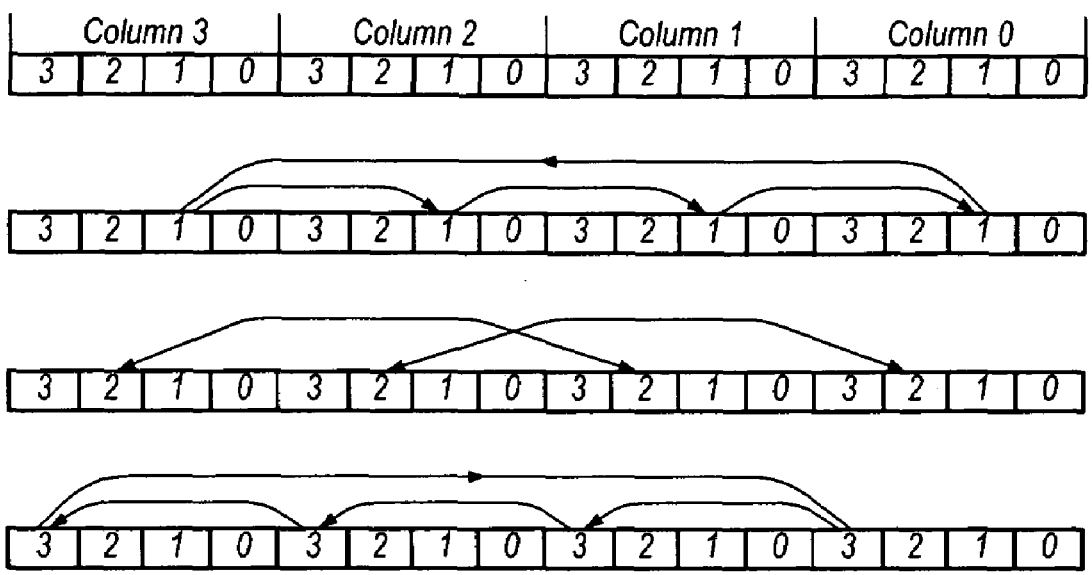
FIG. 16 illustrates the movement of bytes induced by the ShiftRows transformation in one embodiment of the PRCMIXB instruction.
Figure 17:
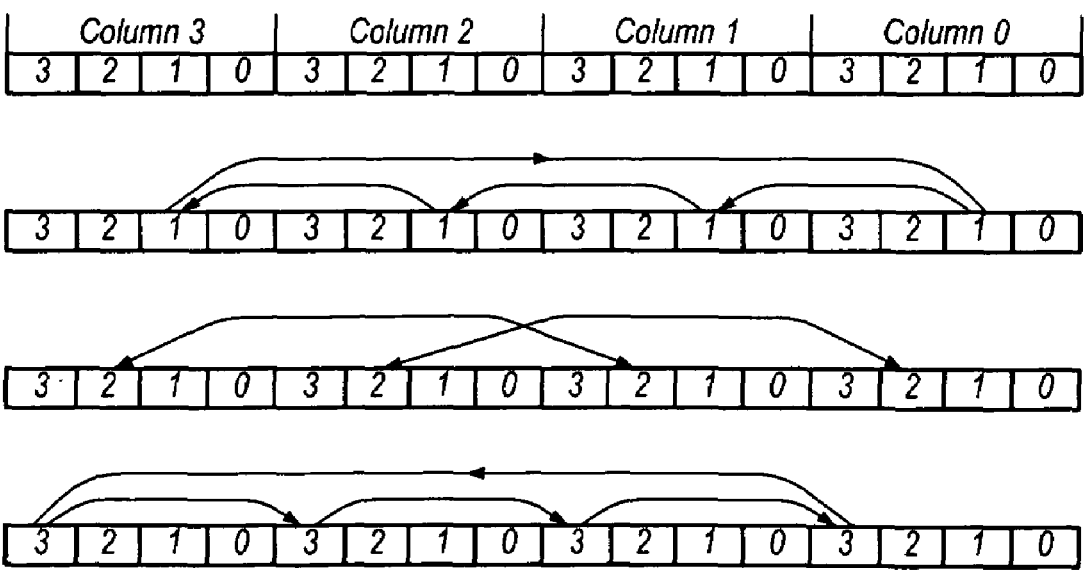
FIG. 17 illustrates the movement of bytes induced by the inverse ShiftRows transformation in one embodiment of the PRCMIXB instruction.

As a consequence of the above mapping, the forward ShiftRows transformation achieves the permutation shown in FIG. 16 on the state register. Four copies of the state register are shown so that the action of the ShiftRows transformation on each row of the state register may be separately depicted. This is equivalent to executing a PPERM (SSE5) or PSHUFB (SSSE3) instruction with a control register setting of 0x0B06.010C.0702.0D08.030E.0904.0F0A.0500. Similarly, the inverse ShiftRows transformation achieves the permutation shown in FIG. 17. This is equivalent to executing a PPERM or PSHUFB instruction with a control register setting of 0x0306.090C.0F02.0508.0B0E.0104.070A.0D00.

MixColumns Transformation

The MixColumns transformation operates on the state as independent columns. Each column represents a $3^{rd}$ order polynomial over GF($2^8$). This polynomial is multiplied modulo $x^4+1$ by a fixed polynomial a(x). For the forward transform that polynomial is: $a(x)=\{03\}x^3+\{01\}x^2+\{01\}x+\{02\}$ For the inverse transform the complementary polynomial is used:

$$a^{-1}(x)=\{0b\}x^3+\{0d\}x^2+\{09\}x+\{0e\}$$

As a result of using the modular reduction polynomial $x^4+1$, the forward transformation $s'(x)=a(x)\otimes s(x)$ can be rewritten as a matrix-vector multiplication as shown in FIG. 18, where c is a column index in the set $\{0, 1, 2, 3\}$. The symbol "$\otimes$" represents polynomial multiplication modulo $x^4+1$.

Using the "●" symbol to represent Galois Field multiplication modulo the prime polynomial 0x11B and "⊕" to represent addition (XOR), each column element can be computed according to the expressions given in FIG. 19.

This operation is repeated for all four columns, for a total of 64 Galois Field (GF) multiplies and 48 adds (XORs). Implementation as generic multiplies would require 64 GF multipliers for a throughput of one transformation per clock cycle. One alternative implementation is to use existing SSE5 instructions. Another alternative implementation is to use a new instruction designed to perform a vectorized, packed, Galois Field multiply operation. The new "PMULGF" instruction multiplies each two corresponding 8-bit fields in a 128-bit register; the result of each multiply, a 16-bit value, is then divided (modulo) by a prime polynomial to make it fit into a corresponding 8-bit resultant element. Four of the PMULGF instructions may be executed in sequence. Both of the alternative implementations will result in performance loss compared to the monolithic approach. The penalty increases with the number of ones in the multiplicand and therefore will be significantly higher in the inverse operation. Implementation as fixed (or hardwired) multiplication can save a significant amount of area. This is even more true as half of the coefficients are {01}=identity.

The multiplication by {02} is equivalent to a left shift by 1 bit and an XOR with 0x1B, if bit 7 of the data was "1".

As a first optimization, one embodiment contemplates building 64 simple, 8-bit wide 2 bit multipliers—each consisting of 16 AND-gates+11 XOR-gates. Seven XOR gates are required to combine the output of the 14 AND gates, 7

MSB of the x1 term and 7 LSB of the x2 term; another four XOR gates combine bit 7 of the x2 term with bit positions 0, 1, 3 and 4—the one's in 0x1B. This is all the circuitry required for the forward transformation.

Logic equations for s[k], k=0, 1, 2, 3, 4, 5, 6, 7, are given in FIG. 20. The inputs include coefficient bits a[1:0] and data b[7:0]. The symbol "^" denotes the exclusive OR (XOR) operation. Product terms and modulus correction terms are shown for each equation.

Pseudo C-Code for calculating s is given in FIG. 21.

The inverse MixColumns transformation $s(x)=a^{-1}(x) \otimes s'(x)$ can also be expressed as a matrix-vector multiplication as shown in FIG. 22.

Using the same notational convention as above, each column element can be computed according to the expressions given in FIG. 23. The first difference one notes is that all four coefficients are different; most coefficients have three bits equal to one and the multipliers contain x4 and x8 terms which makes the modulus operation not as straightforward (more terms are required). Using two of the same multiplier, the multiplication can be split into two parts, one for the lower half, using the same data path, but with a different set of coefficients. The other multiplier handles the upper two bits—the result is then multiplied by {04}, shifted by two bits, and the modulus operation (this time for x4) applied.

Logic equations for the inverse MixColumns transformation are given in FIG. 24. The inputs include coefficient bits a[3:0] and data b[7:0].

Pseudo C-Code for the inverse MixColumns transformation is given in FIG. 25.

Without any coefficient specific optimization the combined total hardware (HW) required to multiply any of the 16 input elements by a 4-bit GF value and then add up four of the 64 intermediate results is shown in the Table of FIG. 26.

Figure 27:
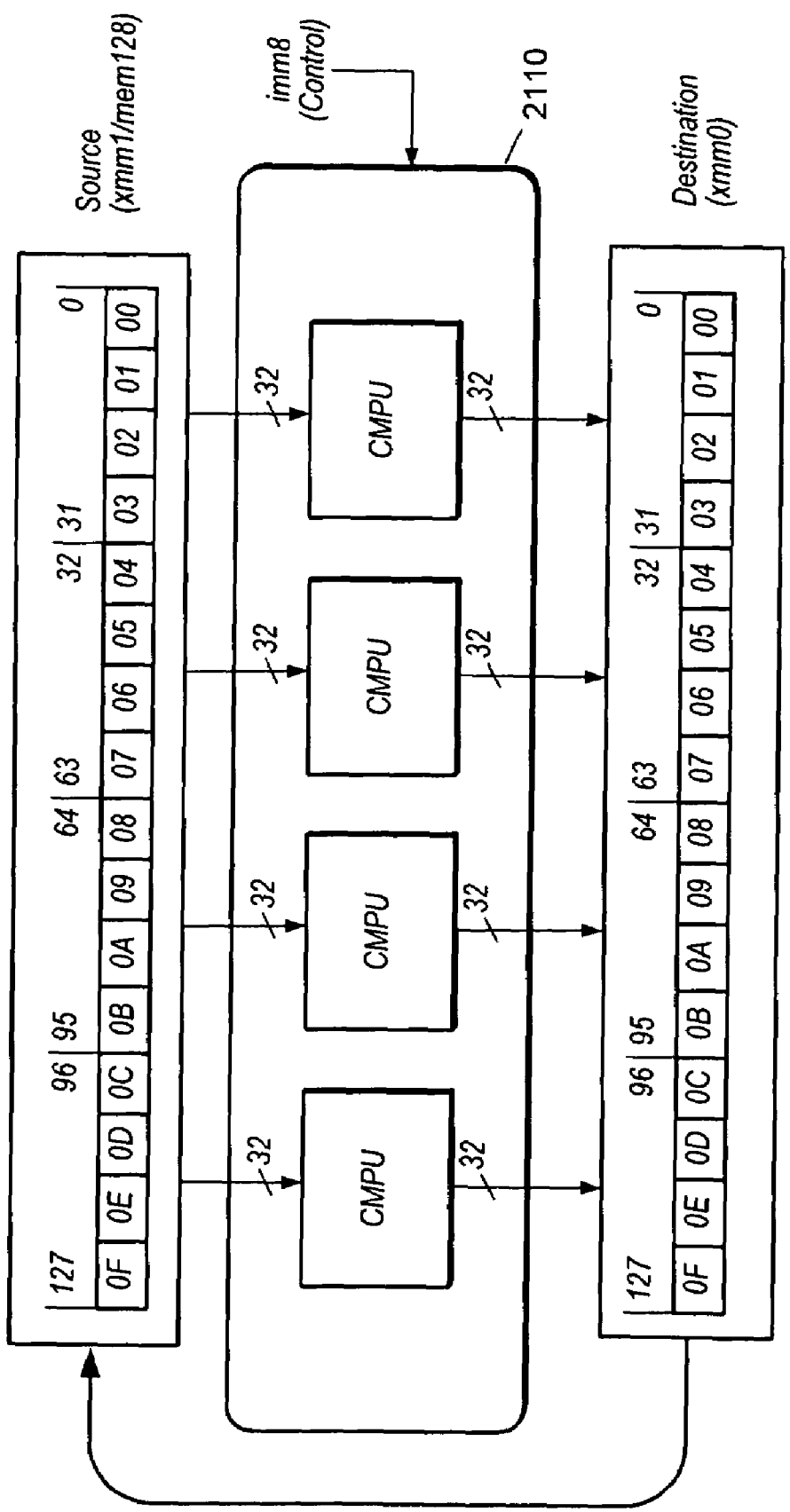
FIG. 27 illustrates a module 2110 used to implement one embodiment of the PRCMIXB instruction in a parallel fashion.

In one embodiment a processor may execute the PRCMIXB instruction using a module 2110 that includes an array of four computational units (CMPU) arranged in parallel as shown in FIG. 27. The computational units collectively operate on the state, which is provided in the 128-bit source operand xmm1/mem128. Each CMPU is configured to operate on a corresponding 32-bit row or column of the state and to generate a 32-bit output of the same kind (row or column).

The array of CMPUs may implement the PRCMIXB instruction in two passes. For example, the forward mode of the PRCMIXB instruction may be implemented as follows. In the first pass, the CMPUs operate on rows of the state to produce updated rows. The destination contents are then fed back to the source. In the second pass, the CMPUs operate on columns of the state to produce updated columns. Thus, in two passes, the CMPUs perform a ShiftRows transformation followed by a MixColumns transformation.

Similarly, the inverse mode of the PRCMIXB instruction may be implemented as follows. In the first pass, the CMPUs operate on columns of the state to produce updated columns. The destination contents are fed back to the source. In the second pass, the CMPUs operate on rows of the state to produce updated columns. Thus, in two passes, the CMPUs perform a MixColumns transformation followed by a MixColumns transformation.

Figure 28:
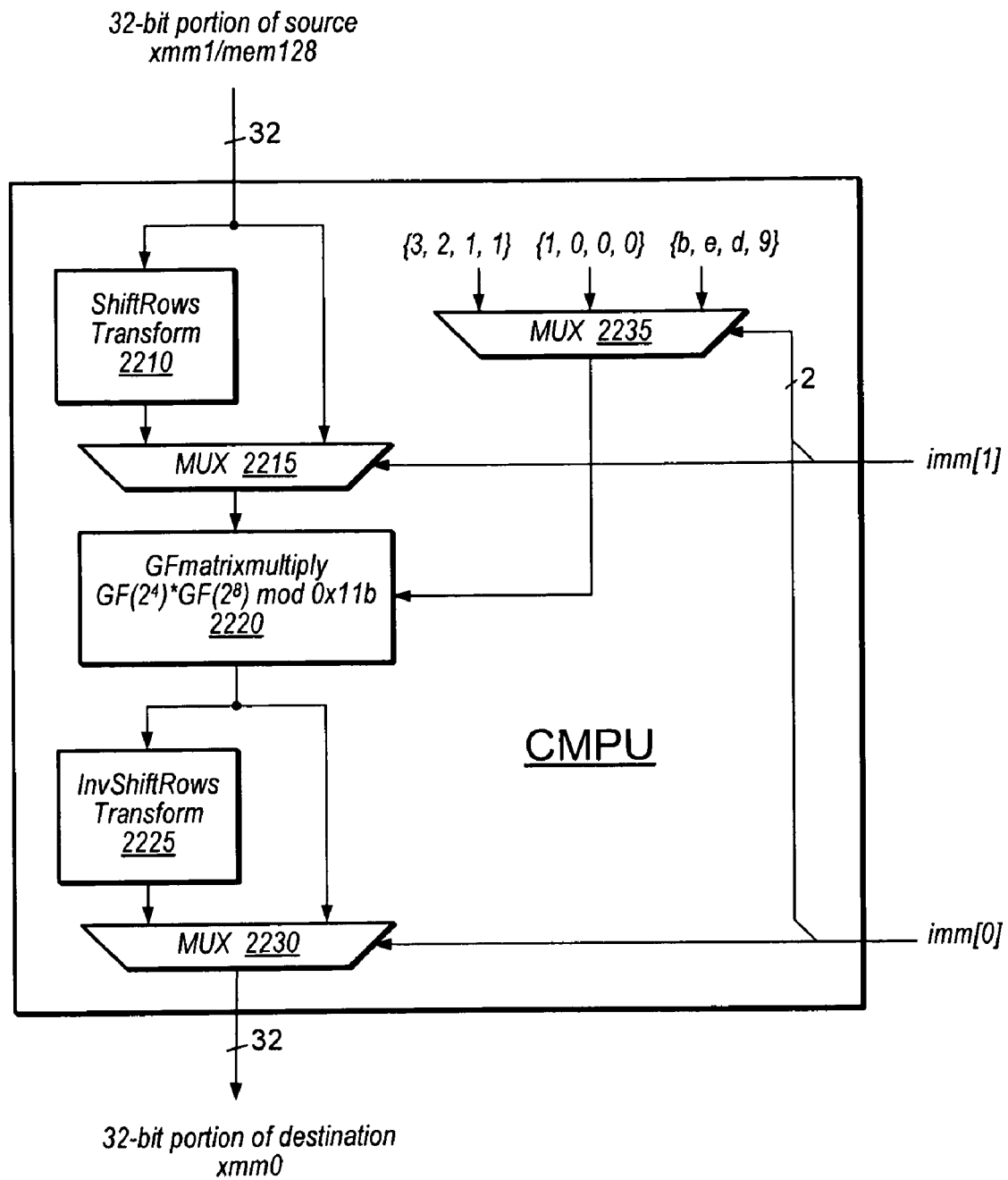
FIG. 28 illustrates one embodiment of the computational unit CMPU of FIG. 27.

FIG. 28 illustrates one embodiment of the CMPU. The CMPU may include a transform unit 2210, a multiplexer 2215, a multiplication unit 2220, an inverse transform unit 2225, a multiplexer 2230 and a multiplexer 2235. A 32-bit portion Y of the state (i.e., a 32-bit portion of the source operand xmm1/mem128) is supplied to the transform unit 2210 and the multiplexer 2215. As noted above the portion Y may be a column or a row of the state. The transform unit 2210 is configured to perform a cyclic left shift on the bytes in the portion Y to obtain a modified portion. The shift distance is one of 0, 1, 2 or 3. (Each CMPU is configured to achieve a different one of these four shift distances.) The cyclic shift may be implemented simply by appropriate wiring of the input lines to output lines in the transform unit 2210. The modified portion is provided to the multiplexer 2215.

The multiplexer 2215 selects either the modified portion or the unmodified portion Y based on a control bit. The control bit may be a bit of the immediate value imm, e.g., the bit imm[1]. The selected portion is provided to multiplication unit 2220.

Multiplexer 2235 selects one of three sets of coefficients based on a pair of control values, e.g., the values imm[1] and imm[0]. The first set {3, 2, 1, 1} is used for the forward MixColumns transformation. The second set {1, 0, 0, 0} is used to achieve an identity mapping. The third set {b, e, d, 9} is used for the inverse MixColumns transformation. The selected set is provided to the multiplication unit 2220.

Multiplication unit 2220 operates on the selected portion and the selected coefficient set to achieve a Galois Field multiplication of the form $p(x) \otimes c(x)$, where the polynomial p(x) is determined by the selected portion and the polynomial c(x) is determined by the selected coefficient set. (See the above description of the ⊗operation.) In the forward mode, c(x)=a(x) as described above. In the inverse mode, $c(x)=a^{-1}(x)$ as described above. In a third mode, $c(x)=\{00\}x^3+\{00\}x^2+\{00\}x+\{01\}$ in order to achieve an identity mapping. The 32-bit resultant of the GF multiplication is provided to the transformation unit 2225 and multiplexer 2230.

Transformation unit 2225 performs a cyclic right shift on the bytes of the 32-bit resultant to obtain a shifted portion. The shift distance is equal to one of 0, 1, 2 or 3. (Each CMPU is configured to achieve a different one of these four shift distances.) The shifted portion is provided to the multiplexer 2230.

Multiplexer 2230 selects either the shifted portion from the transform unit 2225 or the 32-bit resultant from the multiplication unit 2220. The selected portion is provided as the 32-bit output of the CMPU.

AES also specifies a key expansion algorithm that converts a single key into N+1 so-called "round keys." AES-128 uses a 128-bit key and 10 rounds. AES-192 uses a 192-bit key and 12 rounds. AES-256 uses a 256-bit key and 14 rounds.

FIG. 29—Processor

Figure 29:
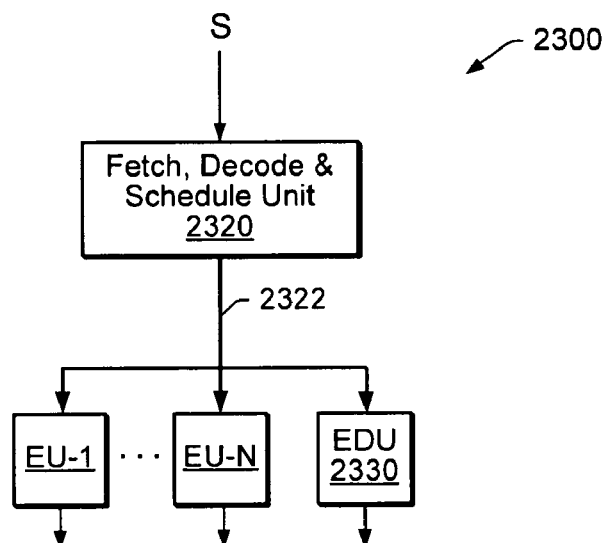
FIG. 29 illustrates one embodiment of a processor for performing encryption and/or decryption.

FIG. 29 illustrates one embodiment of a processor 2300 (e.g., a microprocessor) of a computer system. Processor 2300 may include a fetch-decode-and-schedule (FDS) unit 2320, a plurality of execution units EU-1 through EU-N (where N is a positive integer), an encryption/decryption unit (EDU) 2330.

The FDS unit 2320 may be coupled to the EDU 2330 and the plurality of execution units and may be configured to fetch a stream S of instructions. The stream of instructions includes instructions of a baseline instruction set and an encryption/decryption instruction J1.

As used herein, the term "baseline instruction set" is any instruction set that includes at least a set of general-purpose processing instructions such as instructions for performing integer and floating-point arithmetic, logic operations, bit manipulation, branching and memory access. A "baseline instruction set" may also include other instructions, e.g., instructions for performing simultaneous-instruction multiple-data (SIMD) operations on integer vectors and/or on floating point vectors.

In some embodiments, the baseline instruction set may include an x86 instruction set such as the IA-32 instruction set from Intel or the AMD-64™ instruction set defined by AMD. In other embodiments, the baseline instruction set may include the instruction set of a processor such as a MIPS processor, a SPARC processor, an ARM processor, a PowerPC processor, etc. The baseline instruction set may be defined in an instruction set architecture.

The FDS unit 2320 may be configured to: decode the baseline instructions and the instruction J1; schedule execution of the decoded baseline instructions on the execution units EU-1 through EU-N; and schedule execution of the decoded instruction J1 on the EDU 2330. The EDU may be configured to perform (a) an AddRoundKey transformation followed by a SubBytes transformation or (b) an inverse SubBytes transformation followed by an AddRoundKey transformation in response to the first unit's scheduling of execution of the decoded instruction J1.

In one embodiment, the EDU 2330 may be configured to perform either (a) or (b) depending on the value of an immediate operand supplied as part of the instruction J1, e.g., as described variously above.

In one embodiment, the EDU 2330 may be configured to perform the MixColumns transformation by operating on each column of a two-dimensional state array in parallel, e.g., as described above in connection with FIGS. 27 and 28.

In one embodiment, the EDU 2330 may be configured to perform the AddRoundKey transformation by operating on each element of a two-dimensional state array in parallel, e.g., as described variously above.

In one embodiment, the stream of instructions includes another encryption/decryption instruction J2. The FDS unit 2320 may be configured to decode the instruction J2 and to schedule execution of the decoded instruction J2 on the EDU 2330. The EDU may be configured to perform (c) a ShiftRows transformation followed by a MixColumns transformation or (b) an inverse MixColumns transformation followed by an inverse ShiftRows transformation in response to the first unit's scheduling of execution of the decoded instruction J2.

In one embodiment, the EDU 2330 may be configured to perform the ShiftRows transformation by operating on each row of a two-dimensional state array in parallel, e.g., as described above in connection with FIGS. 27 and 28.

In one embodiment, the instruction J1 is the PSBOX instruction as variously described above, and the instruction J2 is the PRCMIXB instruction as variously described above.

In one embodiment, processor 2400 may be configured on a single integrated circuit. In another embodiments, processor 2400 may include a plurality of integrated circuits.

FIG. 30—Processor

Figure 30:
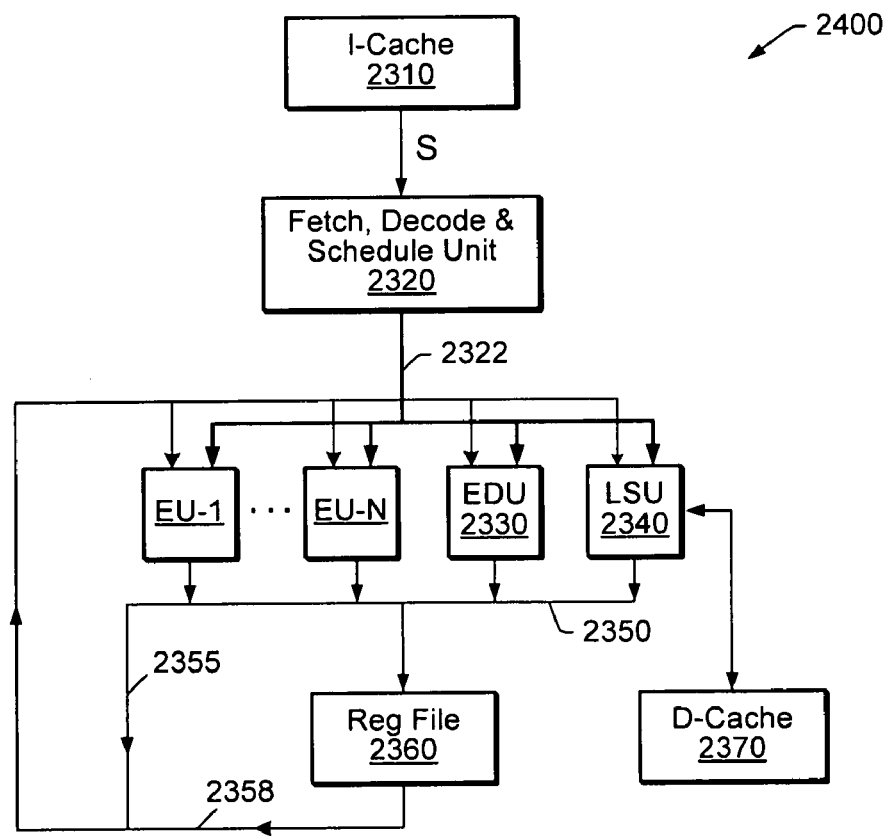
FIG. 30 illustrates another embodiment of a processor performing encryption and/or decryption.

FIG. 30 illustrates one embodiment of a processor 2400 of a computer system. In addition to the units shown in FIG. 29, processor 2400 may include an instruction cache 2310, a load/store unit 2340, a register file 2360 and a data cache 2370.

The instruction cache 2310 may store copies of instructions that have been recently accessed from system memory. (System memory resides external to processor 2400.) FDS unit 2320 may fetch the stream S of instructions from the instruction cache 2310. The stream S includes instructions drawn from the baseline instruction set (as described above) and from an extension set. The extension set includes the encryption/decryption instructions J1 and J2.

Figure 31:
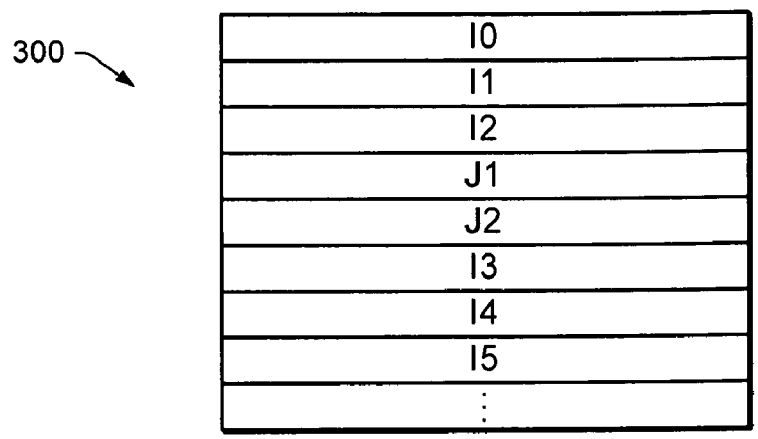
FIG. 31 illustrates an example of the mixing of instructions of a baseline processor and the extension set instructions J1 and J2.

The programmer has the freedom to intermix instructions of the baseline instruction set and the extension set when building a program for processor 2400. An example of this mixing of instructions is shown in FIG. 31. Example stream 300 includes instructions I0, I1, I2, I3, I4, I5, . . . from the baseline instruction set, and instructions J1 and J2 from the extension set.

FDS unit 2320 may decode the stream of fetched instructions into executable operations (ops). Each fetched instruction may be decoded into one or more ops. Some of the fetched instructions (e.g., some of the more complex instructions) may be decoded by accessing a microcode ROM. Furthermore, some of the fetched instructions may be decoded in a one-to-one fashion, i.e., so that the instruction results in a single op that is unique to that instruction.

The FDS unit 2320 may schedule the ops for execution on the execution units including: the execution units EU-1 through EU-N, the EDU 2330, and load/store unit 2340. The FDS unit 2320 may identify any instructions that belong to the extension set and schedule these instructions (i.e., the ops that result from decoding these instructions) for execution in EDU 2330.

As noted above, the FDS unit 2320 may decode each instruction of the stream S of fetched instructions into one or more ops and schedule the one or more ops for execution on appropriate ones of the executions units. In some embodiments, the FDS unit 2320 may be configured for superscalar operation, out-of-order (OOO) execution, multi-threaded execution, speculative execution, branch prediction, or any combination thereof. Thus, in various embodiments, FDS unit 2320 may include various combinations of: logic for determining the availability of the execution units; logic for dispatching two or more ops in parallel (in a given clock cycle) whenever two or more execution units capable of handling those ops are available; logic for scheduling the out-of-order execution of ops and guaranteeing the in-order retirement of ops; logic for performing context switching between multiple threads and/or multiple-processes; etc.

Load/store unit 2340 may couple to a data cache 2370 and may be configured to perform memory write and memory read operations. For a memory write operation, the load/store unit 2340 may generate a physical address and the associated write data. The physical address and write data may be entered into a store queue (not shown) for later transmission to the data cache 2370. Data read from memory may be supplied to load/store unit 2340 from data cache 2370 (or from an entry in the store queue in the case of a recent store).

Execution units EU-1 through EU-N may include one or more integer pipelines and one or more floating-point units. The one or more integer pipelines may include resources for performing integer operations (such as add, subtract, multiply and divide), logic operations (such as AND, OR, and negate), and bit manipulation (such as shift and cyclic shift). In some embodiments, resources of the one or more integer pipelines are operable to perform SIMD integer operations. The one or more floating-point units may include resources for performing floating-point operations. In some embodiments, the resources of the one or more floating-point units are operable to perform SIMD floating-point operations.

In one set of embodiments, the execution units EU-1 through EU-N may include one or more SIMD units configured for performing integer and/or floating point SIMD operations.

As illustrated by FIG. 30, the execution units may couple to a dispatch bus 2322 and a results bus 2350. The execution units receive ops from the FDS unit 2320 via the dispatch bus 2322, and pass the results of execution to register file 2360 via results bus 2350. The register file 2360 couples to feedback path 2358, which allows data from the register file 2360 to be supplied as source operands to the execution units. Bypass path 2355 couples between results bus 2350 and the feedback path, allowing the results of execution to bypass the register file 2360, and thus, to be supplied as source operands to the execution units more directly. Register file 2360 may include physical storage for a set of architected registers.

As noted above, the execution units EU-1 through EU-N may include one or more floating-point units. Each floating-point unit may be configured to execute floating-point instructions (e.g., x87 floating-point instructions, or floating-point instructions compliant with IEEE 754/854). Each floating-point unit may include an adder unit, a multiplier unit, a divide/square-root unit, etc. Each floating-point unit may operate in a coprocessor-like fashion, in which FDS unit 2320 directly dispatches the floating-point instructions to the floating-point unit. The floating-point unit may include storage for a set of floating-point registers (not shown).

Figure 32:
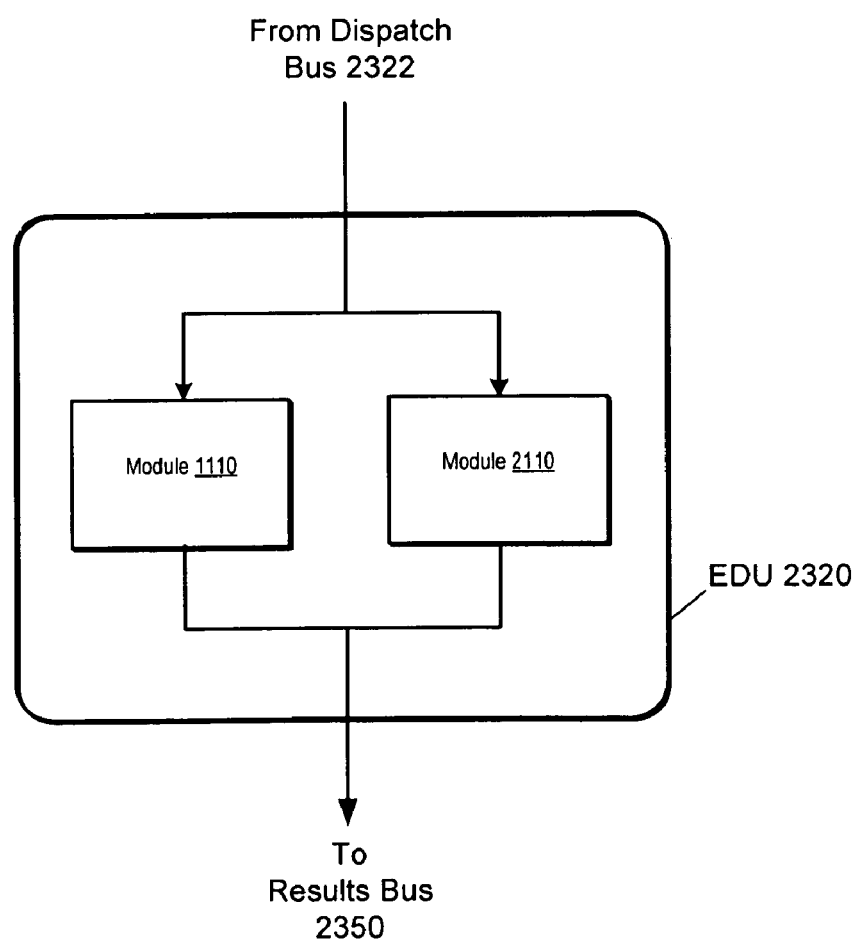
FIG. 32 illustrates one embodiment of the encryption/decryption unit 2330.

As shown in FIG. 32, the EDU 2320 may include modules 1110 and 2110 as described above in connection with FIGS. 11 and 27 respectively. Module 1110 is configured to execute the instruction J1 (in both its forward and inverse modes). Module 2110 is configured to execute the instruction J2 (in both its forward and inverse modes).

In one embodiment, processor 2400 may omit the EDU 2330. In this embodiment, the instructions J1 and J2 may be implemented in microcode using the execution units EU-1 through EU-N (or a subset of these units). Thus, the FDS unit 2330 may include a microcode ROM to translate the instruction J1 into a sequence of ops which are dispatches to appropriate ones of the executions units EU-1 through EU-N. Instruction J2 may be similarly implemented.

FIG. 33—Encryption Method

In one set of embodiments, a method for performing encryption may involve a plurality of rounds (i.e., iterations), where each of the rounds includes the operations shown in FIG. 33.

At 2710, a processor executes a first instruction on a first array of data, where the execution of the first instruction includes (a) performing an AddRoundKey transformation on the first array of data to determine a second array of data and (b) performing a SubBytes transformation on the second array of data to determine a third array of data.

At 2720, the processor executes a second instruction on the third array of data, where the execution of the second instruction includes (c) performing a ShiftRows transformation on the third array of data to determine a fourth array of data and (d) performing a MixColumns transformation on the fourth array of data to determine a fifth array of data.

At 2730, the processor stores the fifth array of data in a memory medium (e.g., in a buffer that holds the encrypted data) after a last of the plurality of rounds. The first data array may be subsequently transferred to another memory medium and/or transmitted onto a communication channel.

A memory medium is a medium configured for the storage of information. Examples of memory media include various kinds of magnetic media (e.g., magnetic tape, magnetic disk, magnetic strips, and magnetic film); various kinds of optical media (e.g., CD-ROM, DVD); various kinds of semiconductor RAM and ROM; and various media based on the storage of electrical charge and/or other physical quantities or combination of physical quantities; etc.

In one embodiment, the communication channel is a computer network such as a local area network, a wide area network or the Internet. In other embodiments, the communication channel is electromagnetic channel (e.g., a radio channel), an optical channel (e.g., a fiber optic channel), a sonar channel, etc. Any of a wide variety of channels are contemplated.

In said performing the AddRoundKey transformation, the processor may operate on elements of the first array in a parallel fashion, e.g., as described above in connection with FIGS. 11 and 12.

In said performing the SubBytes transformation, the processor may operate on elements of the second array in a parallel fashion, e.g., as described above in connection with FIGS. 11 and 12.

In said performing the ShiftRows transformation, the processor may operate on rows of the third array in a parallel fashion, e.g., as described above in connection with FIGS. 27 and 28.

In said performing the MixColumns transformation, the processor may operate on columns of the fourth array in a parallel fashion, e.g., as described above in connection with FIGS. 27 and 28.

FIG. 34—Decryption Method

In one set of embodiments, a method for performing decryption may involve a plurality of rounds (i.e., iterations), where each of the rounds includes the operations shown in FIG. 34. The method operates on encrypted data. The encrypted data may be received from a communication channel or from a memory medium or a combination thereof.

At 2810, a processor executes a first instruction on a first array of data (i.e., a portion of the encrypted data), where said execution of the first instruction includes (a) performing an inverse SubBytes transformation on the first array of data to determine a second array of data and (b) performing an AddRoundKey transformation on the second array of data to determine a third array of data.

At 2820, the processor executes a second instruction on the third array of data, where said execution of the second instruction includes (c) performing an inverse MixColumns transformation on the third array of data to determine a fourth array of data and (d) performing an inverse ShiftRows transformation on the fourth array of data to determine a fifth array of data.

At 2830, the processor stores the fifth array of data in a memory medium after a last of said rounds.

In said performing the inverse SubBytes transformation, the processor may operate on elements of the first array in a parallel fashion, e.g., as described above in connection with FIGS. 11 and 12.

In said performing the AddRoundKey transformation, the processor may operate on elements of the second array in a parallel fashion, e.g., as described above in connection with FIGS. 11 and 12.

In said performing the inverse MixColumns transformation, the processor may operate on columns of the third array in a parallel fashion, e.g., as described above in connection with FIGS. 27 and 28.

In said performing the inverse ShiftRows transformation, the processor may operate on rows of the fourth array in a parallel fashion, e.g., as described above in connection with FIGS. 27 and 28.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing encryption, wherein the method comprises performing a plurality of rounds, wherein each of the plurality of rounds comprises:

a processor executing a first instruction on a first array of data, wherein said execution of the first instruction includes (a) performing an AddRoundKey transformation on the first array of data to determine a second array of data and (b) performing a SubBytes transformation on the second array of data to determine a third array of data;

the processor executing a second instruction on the third array of data, wherein said execution of the second instruction includes (c) performing a ShiftRows transformation on the third array of data to determine a fourth array of data and (d) performing a MixColumns transformation on the fourth array of data to determine a fifth array of data; and the processor storing the fifth array of data in a memory medium after a last of said rounds, wherein the fifth array of data after the last round represents an encrypted version of the first data array used in an initial one of said rounds.

2. The method of claim 1, wherein the AddRoundKey transformation, the SubBytes transformation, the ShiftRows transformation and the MixColumns transformation conform to the encryption standard defined by U.S. FIPS PUB 197.

3. The method of claim 1, wherein, in said performing the AddRoundKey transformation, the processor operates on elements of the first array in a parallel fashion.

4. The method of claim 1, wherein, in said performing the SubBytes transformation, the processor operates on elements of the second array in a parallel fashion.

5. The method of claim 1, wherein, in said performing the ShiftRows transformation, the processor operates on rows of the third array in a parallel fashion.

6. The method of claim 1, wherein, in said performing the MixColumns transformation, the processor operates on columns of the fourth array in a parallel fashion.

7. A method for performing decryption, wherein the method comprises performing a plurality of rounds, wherein each of the plurality of rounds comprises:

a processor executing a first instruction on a first array of data, wherein said execution of the first instruction includes (a) performing an inverse SubBytes transformation on the first array of data to determine a second array of data and (b) performing an AddRoundKey transformation on the second array of data to determine a third array of data;

the processor executing a second instruction on the third array of data, wherein said execution of the second instruction includes (c) performing an inverse MixColumns transformation on the third array of data to determine a fourth array of data and (d) performing an inverse ShiftRows transformation on the fourth array of data to determine a fifth array of data; and the processor storing the fifth array of data in a memory medium after a last of said rounds, wherein the fifth array of data after the last round represents a decrypted version of the first data array used in an initial one of said rounds.

8. The method of claim 7, wherein the inverse SubBytes transformation, the AddRoundKey transformation, the inverse MixColumns transformation and the inverse ShiftRows transformation conform to the encryption standard defined by U.S. FIPS PUB 197.

9. The method of claim 7, wherein, in said performing the inverse SubBytes transformation, the processor operates on elements of the first array in a parallel fashion.

10. The method of claim 7, wherein, in said performing the AddRoundKey transformation, the processor operates on elements of the second array in a parallel fashion.

11. The method of claim 7, wherein, in said performing the inverse MixColumns transformation, the processor operates on columns of the third array in a parallel fashion.

12. The method of claim 7, wherein, in said performing the inverse ShiftRows transformation, the processor operates on rows of the fourth array in a parallel fashion.

13. A processor comprising:
a plurality of execution units;
an encryption/decryption unit (EDU); and
a first unit coupled to the EDU and the plurality of execution units, wherein the first unit is configured to fetch a stream of instructions, wherein the stream of instructions includes: first instructions and a second instruction, wherein the first instructions conform to a baseline instruction set;
wherein the first unit is configured to:
decode the first instructions and the second instruction;
schedule execution of the decoded first instructions on the plurality of execution units; and
schedule execution of the decoded second instruction on the EDU;
wherein the EDU is configured to perform:
(a) an AddRoundKey transformation followed by a SubBytes transformation; or
(b) an inverse SubBytes transformation followed by an AddRoundKey transformation, wherein the EDU is configured to perform (a) or (b) in response to the first unit's scheduling of execution of the decoded second instruction.

14. The processor of claim 13, wherein the AddRoundKey transformation, the SubBytes transformation and the inverse SubBytes transformation conform to the encryption standard defined by U.S. FIPS PUB 197.

15. The processor of claim 13, wherein the stream of instructions also includes a third instruction, wherein the first unit is configured to decode the third instruction and to schedule execution of the decoded third instruction on the EDU, wherein the EDU is configured to perform (c) a ShiftRows transformation followed by a MixColumns transformation or (b) an inverse MixColumns transformation followed by an inverse ShiftRows transformation, wherein the EDU is configured to perform (c) or (d) in response to the first unit's scheduling of execution of the decoded third instruction.

16. The processor of claim 15, wherein the EDU is configured to perform the ShiftRows transformation by operating on each row of a two-dimensional state array in parallel.

17. The processor of claim 15, wherein the EDU is configured to perform the MixColumns transformation by operating on each column of a two-dimensional state array in parallel.

18. The processor of claim 13, wherein the EDU is configured to perform the AddRoundKey transformation by operating on each element of a two-dimensional state array in parallel.

19. The processor of claim 13, wherein the EDU is configured to perform either (a) or (b) depending on the value of an immediate operand supplied as part of the second instruction.

20. The processor of claim 13, wherein the second instruction includes an immediate operand that determines whether (a) or (b) is performed.

* * * * *